United States Patent
Fujiwara et al.

(10) Patent No.: US 9,212,583 B2
(45) Date of Patent: Dec. 15, 2015

(54) AIR-FUEL RATIO CONTROL DEVICE FOR INTERNAL COMBUSTION ENGINE

(75) Inventors: Takahiko Fujiwara, Shizuoka-ken (JP); Koichi Kimura, Numazu (JP); Makoto Tomimatsu, Susono (JP); Junichi Suzuki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 82 days.

(21) Appl. No.: 14/117,440

(22) PCT Filed: May 16, 2011

(86) PCT No.: PCT/JP2011/061176
§ 371 (c)(1),
(2), (4) Date: Nov. 13, 2013

(87) PCT Pub. No.: WO2012/157059
PCT Pub. Date: Nov. 22, 2012

(65) Prior Publication Data
US 2014/0283504 A1    Sep. 25, 2014

(51) Int. Cl.
*F01N 3/00*      (2006.01)
*F01N 3/10*      (2006.01)
(Continued)

(52) U.S. Cl.
CPC .............. *F01N 3/10* (2013.01); *F02D 41/0295* (2013.01); *F02D 41/1441* (2013.01); *F01N 3/101* (2013.01); *F02D 41/18* (2013.01); *F02D 2041/1412* (2013.01); *Y02T 10/22* (2013.01)

(58) Field of Classification Search
CPC ....... F02D 41/029; F01N 9/002; F01N 13/02; F01N 3/035; F02N 3/0842
USPC ............................. 60/285, 286, 295, 299, 301
See application file for complete search history.

(56) References Cited

U.S. PATENT DOCUMENTS 3,842,600 A * 10/1974 Nakajima et al. ............... 60/276
4,617,901 A * 10/1986 Otobe et al. ................... 123/682
(Continued)

FOREIGN PATENT DOCUMENTS

JP    11-082114 A    3/1999
JP    2004183585 A * 7/2004
(Continued)

OTHER PUBLICATIONS

Machine Translation of JP 2007-255355, Translated on Mar. 31, 2015.*
(Continued)

*Primary Examiner* — Patrick Maines
(74) *Attorney, Agent, or Firm* — Sughrue Mion, PLLC

(57) ABSTRACT

An air-fuel ratio control apparatus for an internal combustion engine according to an embodiment of the invention (the present control apparatus) sets a target air-fuel ratio to a target rich air-fuel ratio when it is determined on the basis of the output value Voxs of a downstream air-fuel ratio sensor 67 that the oxygen adsorption amount of a catalyst 43 tends to be excessive, and sets the target air-fuel ratio to a target lean air-fuel ratio when it is determined on the basis of the output value Voxs that the oxygen adsorption amount of the catalyst 43 tends to be insufficient. Further, the present control apparatus determines whether or not an operation state in which a large amount of nitrogen oxide flows into the catalyst 43 is reached on the basis of "whether a predetermined condition is fulfilled", and makes the target rich air-fuel ratio obtained when the predetermined condition is fulfilled less than the target rich air-fuel ratio obtained when the predetermined condition is not fulfilled. As a result, the concentration of a reducing agent inside the catalyst 43 can be increased before a large amount of NOx flows into the catalyst 43. Therefore, when a large amount of NOx flows into the catalyst 43, most of the NOx can be eliminated.

7 Claims, 11 Drawing Sheets

(51) Int. Cl.
*F02D 41/02* (2006.01)
*F02D 41/14* (2006.01)
*F02D 41/18* (2006.01)

(56) References Cited

U.S. PATENT DOCUMENTS

| | | | |
|---|---|---|---|
| 6,085,518 A | 7/2000 | Yamashita et al. | |
| 6,119,449 A * | 9/2000 | Kohler | 60/274 |
| 6,289,672 B1 * | 9/2001 | Katoh et al. | 60/285 |
| 6,505,465 B2 * | 1/2003 | Kanazawa et al. | 60/278 |
| 6,755,015 B1 * | 6/2004 | Manaka | 60/297 |
| 2002/0026790 A1 * | 3/2002 | Shimotani et al. | 60/285 |
| 2010/0217506 A1 | 8/2010 | Mizoguchi et al. | |
| 2011/0277450 A1 * | 11/2011 | Hoyer et al. | 60/274 |
| 2012/0285142 A1 * | 11/2012 | Shibata et al. | 60/274 |
| 2013/0318949 A1 * | 12/2013 | Matsunaga et al. | 60/286 |
| 2013/0338904 A1 * | 12/2013 | Onoe et al. | 701/103 |

FOREIGN PATENT DOCUMENTS

| | | | |
|---|---|---|---|
| JP | 3633295 B2 | | 1/2005 |
| JP | 2007255355 A | * | 10/2007 |
| JP | 2009162139 A | * | 7/2009 |
| JP | 2009-203910 A | | 9/2009 |
| JP | 4390330 B2 | | 10/2009 |

OTHER PUBLICATIONS

Internationa Search Report with Partial Translation of Office Action issued for corresponding International Application No. PCT/JP2011/061176 on Aug. 9, 2011.

* cited by examiner

AIR-FUEL RATIO CONTROL DEVICE FOR INTERNAL COMBUSTION ENGINE

TECHNICAL FIELD

The invention relates to an air-fuel ratio control apparatus for an internal combustion engine that can reduce the discharge of NOx (nitrogen oxides) by effectively using a three-way catalyst provided in an exhaust passage.

BACKGROUND ART

A three-way catalyst has been conventionally provided in the exhaust passage of an internal combustion engine in order to purify the exhaust gas discharged from the engine. It is widely recognized that the three-way catalyst has an oxygen adsorption function. Thus, when excess oxygen is contained in the gas (catalyst inflow gas) flowing into the three-way catalyst, the three-way catalyst adsorbs the oxygen and decreases NOx. When excess unburned matter is contained in the catalyst inflow gas, the three-way catalyst releases the adsorbed oxygen and purifies the unburned matter. The three-way catalyst will be referred to hereinbelow simply as "catalyst".

The conventional air-fuel ratio control apparatus (conventional apparatus) is provided with an upstream air-fuel ratio sensor and a downstream air-fuel ratio sensor disposed upstream and downstream, respectively, of the catalyst in the exhaust passage of the engine. The conventional apparatus controls "the air-fuel ratio (of the gas mixture supplied to the engine (air-fuel ratio of the engine)" so as to match the air-fuel ratio represented by the output value of the upstream air-fuel ratio sensor (detected upstream air-fuel ratio) with the target air-fuel ratio (upstream target air-fuel ratio, target air-fuel ratio of the catalyst inflow gas). This control is called "main feedback control".

The conventional apparatus also controls the air-fuel ratio of the engine by calculating a sub-feedback-amount and substantially changing the upstream target air-fuel ratio by the sub-feedback amount so that the output value of the downstream air-fuel ratio sensor matches the "target value corresponding to the stoichiometric air-fuel ratio" (see, for example, Patent Document 1). The air-fuel ratio control using the sub-feedback amount is called "sub-feedback control".

Patent Document 1: Japanese Patent Application Publication No. 2009-162139

SUMMARY OF THE INVENTION

However, where an acceleration operation is performed with respect to the engine when the engine "is normally operated in a state with a certain large intake air amount thereof", a large amount of NOx (nitrogen oxide) is released from the engine, in particular, when the air-fuel ratio of the engine (air-fuel ratio of the gas mixture supplied to the engine) at the point of time in which the acceleration operation is performed is leaner than the stoichiometric air-fuel ratio. Where the reduction rate (reaction rate for decreasing NOx) of NOx in the catalyst is not sufficiently high in this case, a large amount of NOx flowing into the catalyst is not sufficiently decreased by the catalyst and flows out downstream of the catalyst. Such a situation occurs, for example, when the vehicle carrying the engine is accelerated from a state of cruising at a comparatively high speed to pass another vehicle.

The invention has been created to resolve the above-described problems. Thus, one object of the invention is to provide an air-fuel ratio control apparatus for an internal combustion engine that can reduce the amount of discharged NOx by changing the catalyst state in advance to a state with a high "NOx reduction rate" when a large amount of NOx is predicted to flow into the catalyst.

A control apparatus for an internal combustion engine in accordance with the invention (apparatus of the invention) includes: a catalyst provided in an exhaust passage of the internal combustion engine; a downstream air-fuel ratio sensor provided downstream of the catalyst in the exhaust passage; and air-fuel ratio control means for controlling an air-fuel ratio of the engine, which is an air-fuel ratio of a gas mixture supplied to the engine, on the basis of an output value of the downstream air-fuel ratio.

Further, the air-fuel ratio control means includes condition determination means for determining whether or not a predetermined condition (specific condition) for predicting that an operation state in which a large amount of nitrogen oxide flows into the catalyst is reached is fulfilled, and controls the air-fuel ratio of the engine so that when the predetermined condition is fulfilled, at least either of a concentration of a reducing agent (unburned matter) in the catalyst and a temperature of the catalyst increases over that when the predetermined condition is not fulfilled. Increasing the concentration of the reducing agent inside the catalyst is equivalent in meaning to decreasing the oxygen adsorption amount of the catalyst.

The predetermined condition is, for example, a condition fulfilled when at least either of the following conditions is fulfilled: an intake air amount correlation value that increases as an intake air amount of the engine increases is greater than a low-side air amount threshold and less than a high-side air amount threshold that is greater than the low-side air amount threshold, and a speed of a vehicle carrying the engine is greater than a low-side speed threshold and less than a high-side speed threshold that is greater than the low-side speed threshold.

Further, the predetermined condition is a condition fulfilled when a variation amount of the intake air amount correlation value per unit time is less than a predetermined variation amount threshold.

With such a configuration, the concentration of the reducing agent inside the catalyst is increased and/or the temperature of the catalyst is raised before a large amount of nitrogen oxide flows into the catalyst. Therefore, the reduction rate of NOx in the catalyst has already become high before a large amount of nitrogen oxide flows into the catalyst. As a result, even when a large amount of NOx flows into the catalyst, it can be mostly eliminated (reduced) by the catalyst, thereby making it possible to reduce the discharged amount of NOx.

It is undesirable that the concentration of the reducing agent in the catalyst be maintained at a high value at all times, since the probability of the unburned matter being discharged from the catalyst increases. However, in one aspect of the apparatus of the invention, the concentration of the reducing agent inside the catalyst is maintained at a high value only when the predetermined condition is fulfilled and the exhaust gas temperature in the engine is also rather high when the predetermined condition is fulfilled. Therefore, the catalyst temperature becomes rather high. As a result, the probability of the unburned matter being discharged is low.

It is also undesirable that a high catalyst temperature be maintained because it causes catalyst degradation (sintering or the like). However, in one aspect of the apparatus of the invention, the catalyst temperature is set to a high value only when the predetermined condition is fulfilled. As a result, catalyst degradation does not advance significantly.

In this case, the air-fuel control means is configured to increase the concentration of the reducing agent in the catalyst when the predetermined condition is fulfilled by controlling the air-fuel ratio of the engine so that an average value of the air-fuel ratio of the engine obtained when the predetermined condition is fulfilled becomes less than the average value of the air-fuel ratio of the engine obtained when the predetermined condition is not fulfilled.

More specifically, in one aspect of the apparatus of the invention, the air-fuel ratio control means is provided with target air-fuel ratio setting means and fuel supply amount control means.

The target air-fuel ratio setting means sets a target for the air-fuel ratio of the engine to a target rich air-fuel ratio, which is less than a stoichiometric air-fuel ratio, when it is determined on the basis of the output value of the downstream air-fuel ratio sensor that an oxygen adsorption amount of the catalyst tends to be excessive and a rich request has been generated for causing a gas with a rich air-fuel ratio, which is less than the stoichiometric air-fuel ratio, to flow into the catalyst.

The target air-fuel ratio setting means also sets a target for the air-fuel ratio of the engine to a target lean air-fuel ratio, which is greater than the stoichiometric air-fuel ratio, when it is determined on the basis of the output value of the downstream air-fuel ratio sensor that the oxygen adsorption amount of the catalyst tends to be insufficient and a lean request has been generated for causing a gas with a lean air-fuel ratio, which is greater than the stoichiometric air-fuel ratio, to flow into the catalyst.

The fuel supply amount control means controls a fuel amount supplied to the engine on the basis of the target air-fuel ratio that has been set.

In this case, the target air-fuel ratio setting means is further configured to set the target rich air-fuel ratio obtained when the predetermined condition is fulfilled to an air-fuel ratio which is less than the target rich air-fuel ratio obtained when the predetermined condition is not fulfilled.

The target air-fuel ratio setting means is configured to determine that the rich request has been generated when a variation amount $\Delta Voxs$ of the output value of the downstream air-fuel ratio sensor per unit time has a negative value and the absolute value $|\Delta Voxs|$ thereof is greater than a lean determination threshold dLeanth, and to determine that the lean request has been generated when the variation amount $\Delta Voxs$ has a positive value and the absolute value $|\Delta Voxs|$ thereof is greater than a rich determination threshold dRichth.

With such a configuration, the target rich air-fuel ratio obtained when the predetermined condition is fulfilled becomes less than the target rich air-fuel ratio obtained when the predetermined condition is not fulfilled. Therefore, when the predetermined condition is fulfilled, the average value of the air-fuel ratio of the engine (therefore, the average value of the air-fuel ratio of the catalyst inflow gas, which is the gas flowing into the catalyst) decreases (becomes richer), and therefore the concentration of the reducing agent inside the catalyst increases. As a result, the catalyst state can be set to the "state with the increased NOx reduction rate".

According to another aspect of the apparatus of the invention, the air-fuel ratio setting means includes: catalyst state determination means for determining that a state of the catalyst is an oxygen excess state when a variation amount $\Delta Voxs$ of the output value of the downstream air-fuel ratio sensor per unit time has a negative value and the absolute value $|\Delta Voxs|$ thereof is greater than a lean determination threshold dLeanth, and determining that the state of the catalyst is an oxygen shortage state when the variation amount $\Delta Voxs$ has a positive value and the absolute value $|\Delta Voxs|$ thereof is greater than a rich determination threshold dRichth; target air-fuel ratio setting means for setting a target for the air-fuel ratio of the engine to a target rich air-fuel ratio, which is less than the stoichiometric air-fuel ratio, when a lean delay time, which is a predetermined delay time inclusive of 0, has elapsed since a point of time at which the catalyst state has been determined by the catalyst state determination means to change from the oxygen shortage state to the oxygen excess state, and setting the target for the air-fuel ratio of the engine to a target lean air-fuel ratio, which is greater than the stoichiometric air-fuel ratio, when a rich delay time, which is a predetermined delay time inclusive of 0, has elapsed since a point of time at which the catalyst state has been determined by the catalyst state determination means to change from the oxygen excess state to the oxygen shortage state; and fuel supply amount control means for controlling a fuel amount supplied to the engine on the basis of the target air-fuel ratio that has been set, and the target air-fuel ratio setting means is further configured to set the rich delay time obtained when the predetermined condition is fulfilled to a time longer than the rich delay time obtained when the predetermined condition is not fulfilled.

With such a configuration, when the predetermined condition is fulfilled, the period of time in which the target air-fuel ratio is set to a rich air-fuel ratio is increased by "the extension time of the rich delay time" over that when the predetermined condition is not fulfilled. Therefore, the average value of the air-fuel ratio of the engine (therefore, the average value of the air-fuel ratio of the catalyst inflow gas, which is the gas flowing into the catalyst) decreases (becomes richer) with respect to the stoichiometric air-fuel ratio. As a result, when the predetermined condition is fulfilled, the catalyst state can be set to the "state with the increased NOx reduction rate".

Likewise, the air-fuel ratio setting means includes: target air-fuel ratio setting means for setting a target for the air-fuel ratio of the engine to a target rich air-fuel ratio, which is less than the stoichiometric air-fuel ratio, when a lean delay time, which is a predetermined delay time, has elapsed since a point of time at which the catalyst state has been determined by the catalyst state determination means to change from the oxygen shortage state to the oxygen excess state, and setting the target for the air-fuel ratio of the engine to a target lean air-fuel ratio, which is greater than the stoichiometric air-fuel ratio, when a rich delay time, which is a predetermined delay time inclusive of 0, has elapsed since a point of time at which the catalyst state has been determined by the catalyst state determination means to change from the oxygen excess state to the oxygen shortage state; and fuel supply amount control means for controlling a fuel amount supplied to the engine on the basis of the target air-fuel ratio that has been set, and the target air-fuel ratio setting means is further configured to set the lean delay time obtained when the predetermined condition is fulfilled to a time shorter than the lean delay time obtained when the predetermined condition is not fulfilled.

With such a configuration, when the predetermined condition is fulfilled, the period of time in which the target air-fuel ratio is set to a rich air-fuel ratio is increased by "the reduction time of the lean delay time" over that when the predetermined condition is not fulfilled. Therefore, the average value of the air-fuel ratio of the engine (therefore, the average value of the air-fuel ratio of the catalyst inflow gas, which is the gas flowing into the catalyst) decreases (becomes richer) with respect to the stoichiometric air-fuel ratio. As a result, when the predetermined condition is fulfilled, the catalyst state can be set to the "state with the increased NOx reduction rate".

In another aspect of the apparatus of the invention, the air-fuel ratio setting means includes: target air-fuel ratio setting means for setting a target for the air-fuel ratio of the engine to a target rich air-fuel ratio, which is less than the stoichiometric air-fuel ratio, when a variation amount ΔVoxs of the output value of the downstream air-fuel ratio sensor per unit time has a negative value and the absolute value |ΔVoxs| thereof is greater than a lean determination threshold dLeanth, and setting the target for the air-fuel ratio of the engine to a target lean air-fuel ratio, which is greater than the stoichiometric air-fuel ratio, when the variation amount ΔVoxs has a positive value and the absolute value |ΔVoxs| thereof is greater than a rich determination threshold dRichth; and fuel supply amount control means for controlling a fuel amount supplied to the engine on the basis of the target air-fuel ratio that has been set.

In this case, the target air-fuel ratio setting means is further configured to set the rich determination threshold dRichth obtained when the predetermined condition is fulfilled to a value greater than that of the rich determination threshold dRichth obtained when the predetermined condition is not fulfilled.

Alternatively, the target air-fuel ratio setting means is configured to set the lean determination threshold dLeanth obtained when the predetermined condition is fulfilled to a value less than that of the lean determination threshold dLeanth obtained when the predetermined condition is not fulfilled.

With such configurations, when the predetermined condition is fulfilled, the period of time in which the catalyst state is determined to be an oxygen shortage state becomes shorter and the period of time in which the catalyst state is determined to be the oxygen excess state becomes longer than those when the predetermined condition is not fulfilled. Thus, when the predetermined condition is fulfilled, the period of time in which the target air-fuel ratio is set to a target rich air-fuel ratio becomes relatively long. Therefore, the average value of the air-fuel ratio of the engine (therefore, the average value of the air-fuel ratio of the catalyst inflow gas, which is the gas flowing into the catalyst) decreases (becomes richer) with respect to the stoichiometric air-fuel ratio. As a result, when the predetermined condition is fulfilled, the catalyst state can be set to the "state with the increased NOx reduction rate".

In another aspect of the apparatus of the invention, the air-fuel ratio control means includes: target air-fuel ratio setting means for setting a target for the air-fuel ratio of the engine to a target rich air-fuel ratio, which is less than a stoichiometric air-fuel ratio, when it is determined on the basis of the output value of the downstream air-fuel ratio sensor that an oxygen adsorption amount of the catalyst tends to be excessive and a gas with a rich air-fuel ratio, which is less than the stoichiometric air-fuel ratio, should be caused to flow to the catalyst, and setting a target for the air-fuel ratio of the engine to a target lean air-fuel ratio, which is greater than the stoichiometric air-fuel ratio, when it is determined that the oxygen adsorption amount of the catalyst tends to be insufficient and a gas with a lean air-fuel ratio, which is greater than the stoichiometric air-fuel ratio, should be caused to flow to the catalyst; and fuel supply amount control means for controlling a fuel amount supplied to the engine on the basis of the target air-fuel ratio that has been set.

In this case, the target air-fuel ratio setting means further raises the temperature of the catalyst by increasing the amount of heat generated inside the catalyst by setting the target rich air-fuel ratio obtained when the predetermined condition is fulfilled to an air-fuel ratio which is less than the target rich air-fuel ratio obtained when the predetermined condition is not fulfilled and by setting the target lean air-fuel ratio obtained when the predetermined condition is fulfilled to an air-fuel ratio which is greater than the target lean air-fuel ratio obtained when the predetermined condition is not fulfilled. In this case, it preferred that the target air-fuel ratios be set such that the average of the target rich air-fuel ratio obtained when the predetermined condition is fulfilled and the target lean air-fuel ratio obtained when the predetermined condition is fulfilled is the stoichiometric air-fuel ratio or a value less than the stoichiometric air-fuel ratio.

With such a configuration, the amplitude of the air-fuel ratio of the gas flowing into the catalyst increases when the predetermined condition is fulfilled. Therefore, the reaction in the catalyst is activated, thereby increasing the reaction heat. As a result, when the predetermined condition is fulfilled, the catalyst temperature can be increased over that when the predetermined condition is not fulfilled. Therefore, the catalyst state can be set to the "state with the increased NOx reduction rate".

Other objects, features and attendant advantages of the apparatus in accordance with the invention will become apparent from the explanation of the embodiments of the invention described hereinbelow with reference to the appended drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

MODES FOR CARRYING OUT THE INVENTION

The air-fuel ratio control apparatus for an internal combustion engine (referred to hereinbelow simply as "control apparatus") according to the embodiments of the invention will be described below with reference to the appended drawings. The control apparatus is part of a fuel injection amount control apparatus controlling the fuel injection amount (fuel supply amount) contained in the gas mixture supplied to the internal combustion engine.

First Embodiment (Structure)

Figure 1:
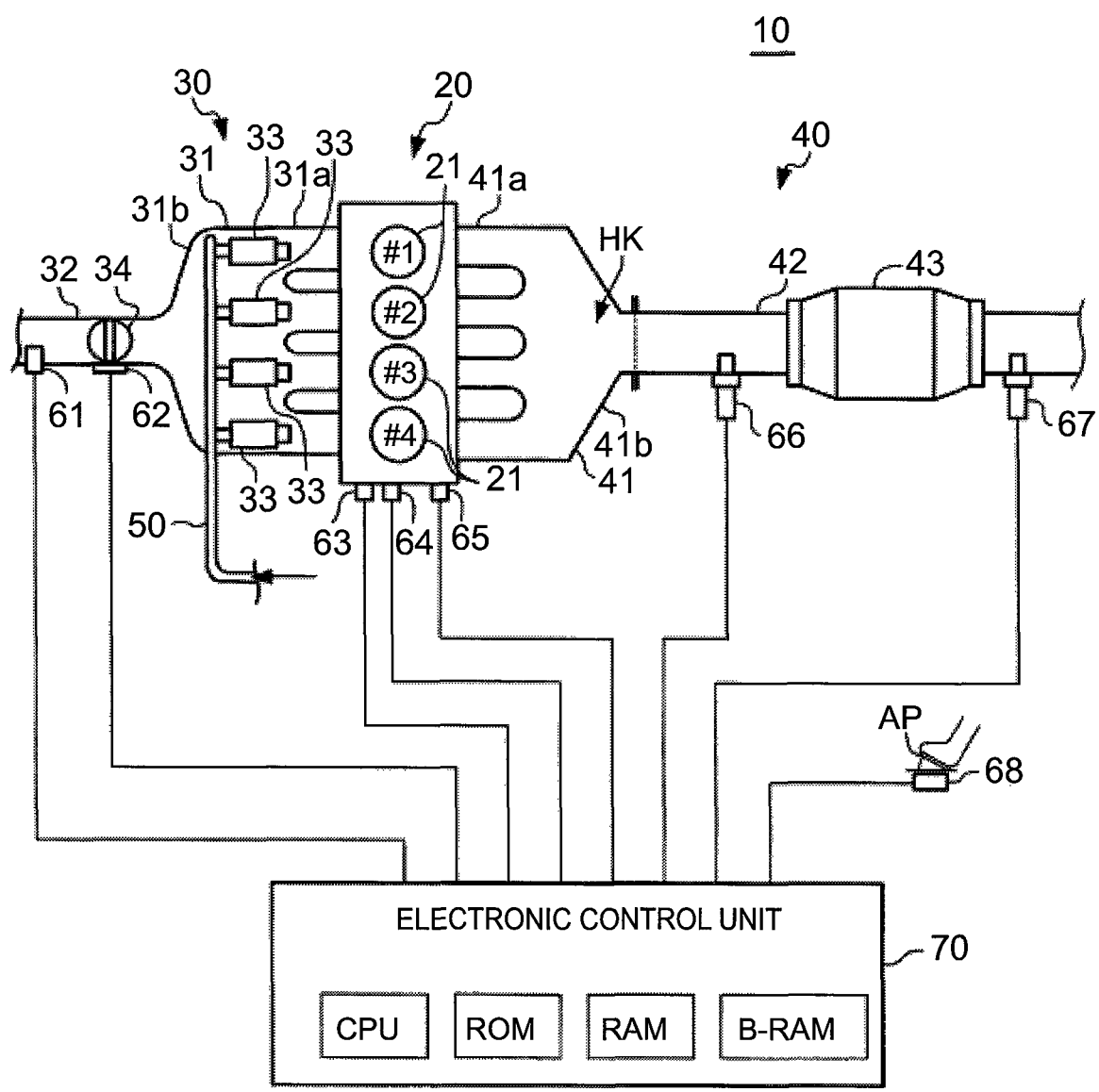
FIG. 1 is a schematic plan view of the internal combustion engine using the air-fuel ratio control apparatus according to the embodiments of the invention.

FIG. 1 shows a schematic configuration of a system in which the control apparatus (referred to hereinbelow as "first control apparatus") according to the first embodiment is used in a multi-cylinder (inline four cylinders) internal combustion engine 10 of a four-cycle spark-ignition system. The internal combustion engine 10 includes an engine main body unit 20, an intake system 30, and an exhaust system 40.

The engine main body unit 20 includes a cylinder block unit and a cylinder head unit. The engine main body unit 20 is provided with a plurality of cylinders (combustion chambers) 21. Each cylinder communicates with "an intake port and an exhaust port" which are not shown in the figure. The communication section of the intake port and the combustion chamber 21 is opened and closed by an intake valve which is not shown in the figure. The communication section of the exhaust port and the combustion chamber 21 is opened and closed by an exhaust valve which is not shown in the figure. A spark plug, which is not shown in the figure, is provided in each combustion chamber 21.

The intake system 30 is provided with an intake manifold 31, an intake pipe 32, a plurality of fuel injection valves 33, and a throttle valve 34.

The intake manifold 31 is provided with a plurality of branches 31a and a surge tank 31b. One end of each of the plurality of branches 31a is connected to a respective intake port from the plurality of intake ports. The other end of each of the plurality of branches 31a is connected to the surge tank 31b.

One end of the intake pipe 32 is connected to the surge tank 31b. An air filter, which is not shown in the figure, is disposed at the other end of the intake pipe 32.

One fuel injection valve 33 is provided in each cylinder (combustion chamber) 21. The fuel injection valve 33 is provided in the intake port. The fuel is supplied from a fuel tank, which is not shown in the figure, through a fuel pipe 50 to the fuel injection valves 33. The fuel injection valve 33 is opened in response to an injection indication signal, and the "fuel in the indicated fuel injection amount included in the injection indication signal" is injected into the intake port (therefore, into the cylinder 21 corresponding to the fuel injection valve 33).

The throttle valve 34 is rotatably arranged inside the intake pipe 32. The throttle valve 34 can change the opening cross section of the intake passage. The throttle valve 34 is rotationally driven inside the intake pipe 32 by a throttle valve actuator which is not shown in the figure.

The exhaust system 40 is provided with an exhaust manifold 41, an exhaust pipe 42, an upstream catalyst 43 provided in the exhaust pipe 42, and a "downstream catalyst (not shown in the figure)" which is provided in the exhaust pipe 42 downstream of the upstream catalyst 43.

The exhaust manifold 41 is provided with a plurality of branches 41a and a collection unit 41b. One end of each of the plurality of branches 41a is connected to the respective exhaust port. The other ends the plurality of branches 41a are collected in the collection unit 41b. Since the collection unit 41b is a portion where the exhaust gas discharged from a plurality of cylinders (two or more, in the present example, four cylinders), it is also called an exhaust gas collection unit HK.

The exhaust pipe 42 is connected to the collection unit 41b. The exhaust port, exhaust manifold 41, and exhaust pipe 42 constitute an exhaust passage.

The upstream catalyst 43 and the downstream catalyst are each the so-called three-way catalytic device (catalyst for exhaust gas purification) in which an active component constituted by a noble metal (catalytic substance) such as platinum, rhodium, and palladium is supported. The catalysts have a function of oxidizing unburned components such as HC, CO, and $H_2$ and reducing nitrogen oxide (NOx) when the air-fuel ratio of the gas flowing into the catalyst is the "air-fuel ratio within the window of the three-way catalyst (for example, the stoichiometric air-fuel ratio)".

The catalysts also have an oxygen adsorption function of adsorbing (storing) oxygen. Thus, when excessive oxygen is contained in the gas flowing into the catalyst (catalyst inflow gas), the catalysts adsorb the oxygen and decrease NOx. When excessive unburned matter is contained in the catalyst inflow gas, the catalysts release the adsorbed oxygen and purify the unburned matter. The amount of oxygen released by the catalyst increases with the decrease in the air-fuel ratio of the catalyst inflow gas. In a state in which a large, amount of oxygen is released (in other words, a state with a large concentration of the reducing agent inside the catalyst), the catalyst can reduce NOx at a higher reaction rate.

The oxygen adsorption function of the catalyst is realized by the oxygen adsorbing material, such as ceria ($CeO_2$) or the like, supported in the catalyst. Even if the air-fuel ratio is shifted from the stoichiometric air-fuel ratio, the oxygen adsorption function still enables the catalysts to purify the unburned components and nitrogen oxide. In other words, the oxygen adsorption function enlarges the window width.

The system is equipped with a hot-wire air flow meter 61, a throttle position sensor 62, a water temperature sensor 63, a crank position sensor 64, an intake cam position sensor 65, an upstream air-fuel ratio sensor 66, a downstream air-fuel ratio sensor 67, and an accelerator depression amount sensor 68.

The air flow meter 61 outputs a signal corresponding to the mass flow rate (intake air flow rate) Ga of the intake air flowing inside the intake pipe 32. Thus, the intake air rate Ga represents the intake air amount taken per unit time into the engine 10.

The throttle position sensor 62 detects the opening degree of the throttle valve 34 (throttle valve opening degree) and outputs a signal representing the throttle valve opening degree TA.

The water temperature sensor 63 detects the temperature of cooling water in the engine 10 and outputs a signal representing the cooling water temperature THW. The cooling water temperature THW is an operation state indicating an amount that represents the warm-up state of the engine 10 (temperature of the engine 10).

The crank position sensor 64 outputs a signal having a narrow pulse for every 10° of crank shaft rotation and a wide pulse for every 360° of the crank shaft rotation. The signal is converted into an engine revolution speed NE by the below-described electronic control unit 70.

The intake cam position sensor 65 outputs a pulse when the intake cam shaft rotates through 90 degrees, then 90 degrees and further 180 degrees from a predetermined angle. The below-described electronic control unit 70 acquires an absolute crank angle CA using the compression top dead center of a reference cylinder (for example, the first cylinder) as a reference on the basis of the signals from the crank position sensor 64 and the intake cam position sensor 65. The absolute crank angle CA is set to a "0° crank angle" in the compression top dead center of the reference cylinder, increases to a 720° crank angle according to the rotation angle of the crank shaft, and is set again to the 0° crank angle at this point of time.

The upstream air-fuel ratio sensor 66 is provided "at either of the exhaust manifold 41 and the exhaust pipe 42" at a position between the collection unit 41b (exhaust collection unit HK) of the exhaust manifold 41 and the upstream catalyst 43.

The upstream air-fuel ratio sensor 66 is, for example, "the broad-band air-fuel ratio sensor of a critical current type provided with a diffusion resistance layer" that is disclosed in Japanese Patent Application Publication No. 11-72473 (JP-11-72473 A), Japanese Patent Application Publication No 2000-65782 (JP-2000-65782 A), and Japanese Patent Application Publication No. 2004-69547 (JP-2004-69547 A)

Figure 2:
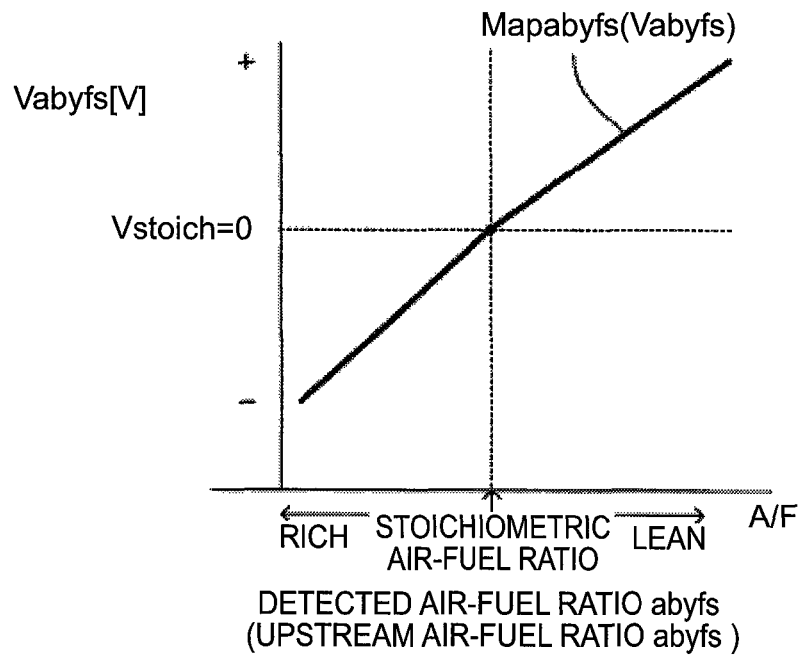
FIG. 2 is a graph showing the relationship between the air-fuel ratio (upstream air-fuel ratio) of the gas flowing into the catalyst shown in FIG. 1 and the output value of the upstream air-fuel ratio sensor shown in FIG. 1.

The upstream air-fuel ratio sensor 66 outputs an output value Vabyfs corresponding to the air-fuel ratio of the exhaust gas flowing at the installation position of the upstream air-fuel ratio sensor 66 (air-fuel ratio of the "catalyst inflow gas", which is the gas flowing into the catalyst 43; upstream air-fuel ratio abyfs). As shown in FIG. 2, the output value Vabyfs increases with the increase in the air-fuel ratio (upstream air-fuel ratio abyfs) of the catalyst inflow gas (as the air-fuel ratio shifts to the lean side).

The electronic control unit 70 stores an air-fuel ratio conversion table (map) Mapabyfs that specifies the relationship (shown in FIG. 2) between the output value Vabyfs and the upstream air-fuel ratio abyfs. The electronic control unit 70 detects the actual upstream air-fuel ratio abyfs (acquires the detected upstream air-fuel ratio abyfs) by using the output value Vabyfs in the air-fuel ratio conversion table Mapabyfs.

Referring to FIG. 1 again, the downstream air-fuel ratio sensor 67 is provided inside the exhaust pipe 42. The arrangement position of the downstream air-fuel ratio sensor 67 is downstream of the upstream catalyst 43 and upstream of the downstream catalyst (that is, in the exhaust passage between the upstream catalyst 43 and the downstream catalyst). The downstream air-fuel ratio sensor 67 is a conventional oxygen concentration sensor of an electromotive force type (a conventional oxygen concentration sensor of a concentration cell type that uses a solid electrolyte such as stabilized zirconia). The downstream air-fuel ratio sensor 67 generates an output value Voxs corresponding to the air-fuel ratio of the to-be-detected gas that passes through a site where the downstream air-fuel ratio sensor 67 is provided in the exhaust passage. In other words, the output value Voxs corresponds to the air-fuel ratio of the gas flowing out of the upstream catalyst 43 and fowling into the downstream catalyst.

Figure 3:
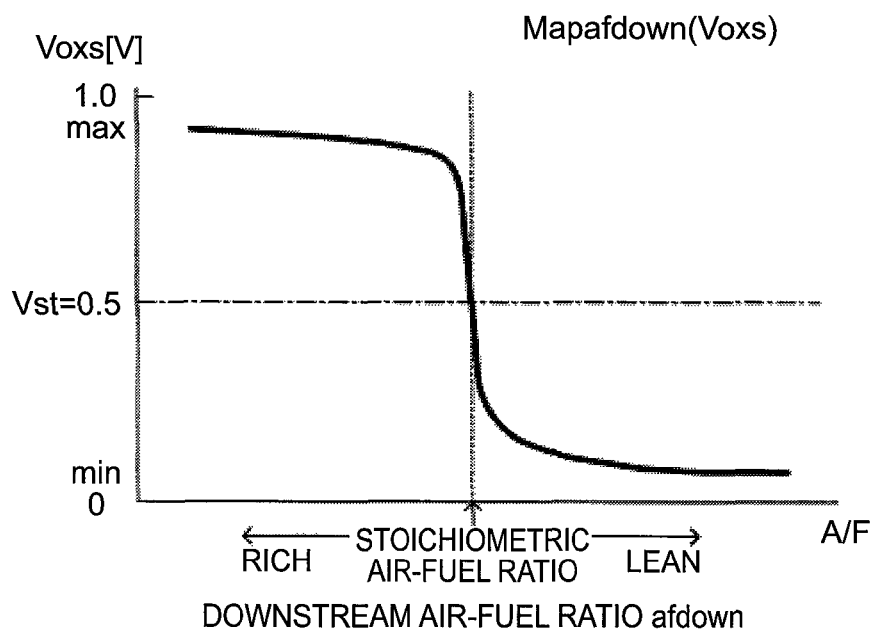
FIG. 3 is a graph showing the relationship between the air-fuel ratio (downstream air-fuel ratio) of the gas flowing out of the catalyst shown in FIG. 1 and the output value of the downstream air-fuel ratio sensor shown in FIG. 1.

As shown in FIG. 3, this output value Voxs becomes a maximum output value max (for example, about 0.9 V to 1.0 V) when the air-fuel ratio of the gas which is to be detected is richer than the stoichiometric air-fuel ratio. This output value Voxs becomes a minimum output value min (for example, about 0.1 V to 0 V) when the air-fuel ratio of the gas which is to be detected is leaner than the stoichiometric air-fuel ratio. This output value Voxs becomes a voltage Vst (central value Vmid, intermediate voltage Vst, for example, about 0.5 V) which is substantially between the maximum output value max and the minimum output value min when the air-fuel ratio of the gas which is to be detected is the stoichiometric air-fuel ratio. The output value Voxs changes rapidly from the maximum output value max to the minimum output value min when the air-fuel ratio of the gas which is to be detected changes from the air-fuel ratio that is richer than the stoichiometric air-fuel ratio to the air-fuel ratio that is leaner than the stoichiometric air-fuel ratio. Likewise, the output value Voxs changes rapidly from the minimum output value min to the maximum output value max when the air-fuel ratio of the gas which is to be detected changes from the air-fuel ratio that is leaner than the stoichiometric air-fuel ratio to the air-fuel ratio that is richer than the stoichiometric air-fuel ratio.

The accelerator depression amount sensor 68 shown in FIG. 1 outputs a signal representing the operation amount Accp (accelerator pedal operation amount, depression amount of the accelerator pedal AP) of the accelerator pedal AP operated by the driver. The accelerator pedal operation amount Accp increases with the increase in the operation amount of the accelerator pedal AP.

The electronic control unit 70 is a conventional microcomputer constituted by "a CPU, a read only memory (ROM) in which the programs executed by the CPU, tables (maps, functions), and constants have been stored in advance, a random access memory (RAM) in which the CPU temporarily stores data, a backup RAM (B-RAM), and an interface including an alternating current-to-direct current (AD) converter".

The backup RAM receives power supply from the battery carried by the vehicle, regardless of the position of the ignition key switch (not shown in the figure) in the vehicle carrying the engine 10 (OFF position, START position, or ON position). When the supply of power is received from the battery, the backup RAM saves data (data are written) according to the indication from the CPU and holds (stores) the data in a readable format. Therefore, the backup RAM can hold the data even when the operation of the engine 10 is stopped.

Where the supply of power from the battery is interrupted, for example, because the battery is taken off the vehicle, the backup RAM cannot hold the data. Accordingly, when the supply of power to the backup RAM is restarted, the CPU initializes (sets to default values) the data that should be held in the backup RAM. The backup RAM may be a readable/writable nonvolatile memory such as an electronically erasable programmable read only memory (EEPROM).

The electronic control unit 70 is connected to the above-described sensors and supplies signals from the sensors to the CPU. The electronic control unit 70 also transmits drive signals (indication signals) to ignition plugs (actually, to the igniters) provided for each cylinder and to the fuel injection valves 33 provided for each cylinder and to the throttle valve actuators in response to CPU indications.

The electronic control unit 70 also transmits indication signals to the throttle valve actuators such that the throttle valve opening degree TA increases with the increase in the acquired operation amount Accp of the accelerator pedal. Thus, the electronic control unit 70 is provided with throttle valve drive means for changing the opening degree of "the throttle valve 34 provided in the intake passage of the engine 10" according to the acceleration operation amount (accelerator pedal operation amount Accp) of the engine 10 that is changed by the driver.

(Summary of Actuation of First Control Apparatus)

The first control apparatus determines whether the state (oxygen adsorption state) of the catalyst 43 is the oxygen excess state or the oxygen shortage state on the basis of the output value Voxs of the downstream air-fuel ratio sensor 67.

The oxygen excess state is referred to as a lean state. In the oxygen excess state, the oxygen adsorption amount of the catalyst 43 tends to be excessive and assumes a value close to the maximum oxygen adsorption amount Cmax.

The oxygen shortage state is referred to as a rich state. In the oxygen shortage state, the oxygen adsorption amount of the catalyst 43 tends to be insufficient and assumes a value close to "0".

More specifically, where the variation amount ΔVoxs of the output value Voxs per predetermined time has a positive value and the absolute value |ΔVoxs| thereof becomes greater than the rich determination threshold dRichth in the case in which the state of the catalyst 43 is determined to be the oxygen excess state, the first control apparatus determines that the state of the catalyst 43 has become the oxygen shortage state. In this case, the first control apparatus sets the value of a catalyst lean state display flag XCCROLean to "0".

Further, where the variation amount ΔVoxs assumes a negative value and the absolute value |ΔVoxs| thereof becomes greater than the lean determination threshold dLeanth when the state of the catalyst 43 is determined to be the oxygen shortage state, the first control apparatus determines that the state of the catalyst 43 has become the oxygen excess state. In this case, the first control apparatus sets the value of a catalyst lean state display flag XCCROLean to "1".

Where the output value Voxs becomes greater than the rich determination threshold VRichth when the state of the catalyst 43 is determined to be the oxygen excess state, the first control apparatus may determine that the state of the catalyst 43 has become the oxygen shortage state. Further, where the output value Voxs becomes less than the lean determination threshold VLeanth when the state of the catalyst 43 is determined to be the oxygen shortage state, the first control apparatus may determine that the state of the catalyst 43 has become the oxygen excess state.

When the state of the catalyst 43 is the oxygen excess state, excess unburned matter should be caused to flow to the catalyst 43. Accordingly, when the state of the catalyst 43 has been determined to be the oxygen excess state (when the value of the catalyst lean state display flag XCCROLean has been set to "1"), the first control apparatus sets the value of a rich request flag XRichreq to "1" (determines that a rich request has been generated) and sets the "target air-fuel ratio abyfr which is the target for the air-fuel ratio of the gas mixture supplied to the engine" to the "target rich air-fuel ratio afRich which is less than the stoichiometric air-fuel ratio". The target air fuel ratio abyfr is also the target for the air-fuel ratio of exhaust gas flowing into the catalyst 43.

By contrast, where the state of the catalyst 43 is the oxygen shortage state, excess oxygen should be caused to flow to the catalyst 43. Accordingly, when the state of the catalyst 43 has been determined to be the oxygen shortage state (when the catalyst lean state display flag XCCROLean has been set to "0"), the first control apparatus sets the value of the rich request flag XRichreq to "0" (determines that a lean request has been generated) and sets the target air-fuel ratio abyfr to the "target lean air-fuel ratio afLean which is greater than the stoichiometric air-fuel ratio".

Then, the first control apparatus determines whether or not a state has been attained in which it can be predicted that an operation state in which a large amount of nitrogen oxide flows into the catalyst 43 is reached. More specifically, the first control apparatus predicts that the operation state in which a large amount of nitrogen oxide flows into the catalyst 43 is reached when all of the below described conditions (referred to hereinbelow simply as "predetermined conditions" or "specific conditions") are fulfilled.

(Condition 1) The intake air amount Ga is greater than a low-side air amount threshold GaLoth and less than a high-side air amount threshold GaHith. The high-side air amount threshold GaHith is greater than the low-side air amount threshold GaLoth.

(Condition 2) The value (|ΔGa|) of the variation amount of the intake air amount Ga per unit time is less than a predetermined variation amount threshold ΔGath.

The intake air amount Ga in Condition 1 and Condition 2 can be replaced with the load KL, throttle valve opening degree TA and accelerator pedal operation amount Accp. Those are the parameters that increase with the increase in the intake air amount Ga and can be called intake air amount correlation parameters. The load KL in the present example is a load ratio (filling ratio) KL and can be calculated by Equation (1) below. In Equation (1), Mc(k) stands for the amount of air (units: (g)) taken in by a certain cylinder in one intake stroke, ρ is the air density (units: (g/l), L is the exhaust air amount (units: (l)) of the engine 10, and 4 is the number of cylinders in the engine 10.

$$KL = \{Mc(k)/(\rho \cdot L/4)\} \cdot 100(\%) \quad (1)$$

The abovementioned Condition 1 may be also replaced with the condition of "the speed of the vehicle carrying the engine 10 being greater than "the low-side speed threshold" and being less than "the high-side speed threshold which is greater than the low-side speed threshold"".

Figure 4:
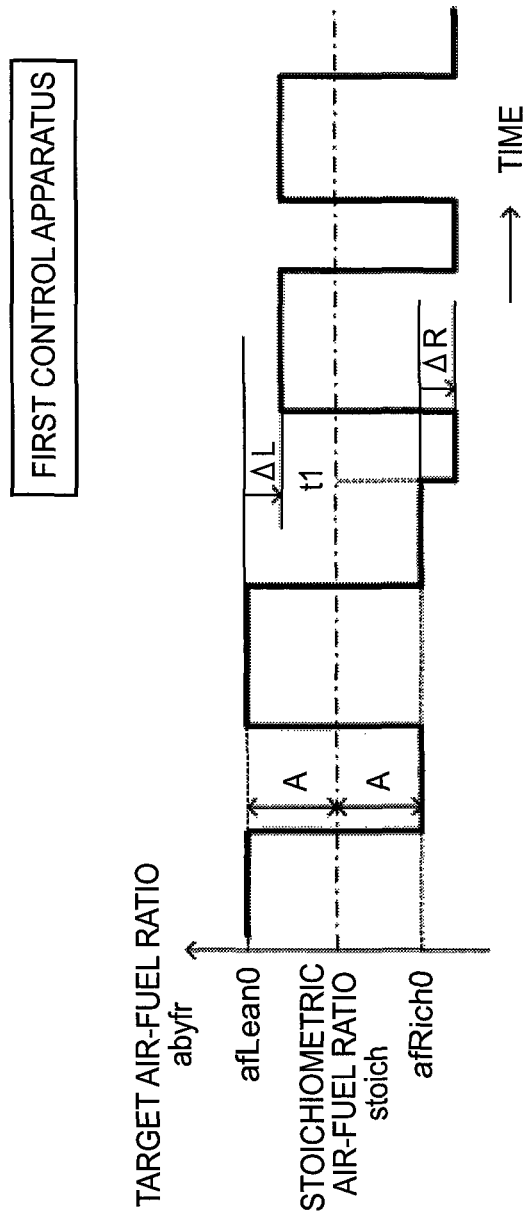
FIG. 4 is a time chart showing the target air-fuel ratio which is changed by the control apparatus (first control apparatus) according to the first embodiment of the invention.

When the predetermined conditions are not fulfilled (that is, when at least either of Condition 1 and Condition 2 is not fulfilled), the first control apparatus sets the target lean air-fuel ratio afLean to a reference target lean air-fuel ratio afLean0 and sets the target rich air-fuel ratio afRich to a reference target rich air-fuel ratio afRich0, as shown by the time before the timing t1 in FIG. 4. The reference target lean air-fuel ratio afLean0 is an air-fuel ratio that is greater by a positive predetermined amount A than the stoichiometric air-fuel ratio. The reference target rich air-fuel ratio afRich0 is an air-fuel ratio that is less by the positive predetermined amount A than the stoichiometric air-fuel ratio. Therefore, the average value of the reference target lean air-fuel ratio afLean0 and the reference target rich air-fuel ratio afRich0 is the stoichiometric air-fuel ratio stoich.

By contrast, when the predetermined conditions are fulfilled (that is, when Condition 1 and Condition 2 are both fulfilled), the first control apparatus sets the target lean air-fuel ratio afLean to "a value (afLean0-ΔL) that is less by a positive predetermined value ΔL than the reference target lean air-fuel ratio afLean0" and sets the target rich air-fuel ratio afRich to "a value (afRich0-ΔR) that is less by a positive predetermined value ΔR than the reference target rich air-fuel ratio afRich0" as shown by the time after the timing t1 in FIG. 4. The value (afLean0-ΔL) is greater than the stoichiometric air-fuel ratio stoich.

As a result, since the average of the air-fuel ratio of the exhaust gas flowing into the catalyst 43 is "less than the stoichiometric air-fuel ratio stoich", the concentration of the reducing agent in the catalyst 43 increases after the timing t1 over that before the timing t1. Therefore, when the engine 10 is thereafter accelerated and a large amount of NOx flows into the catalyst 43, since the reduction rage of NOx in the catalyst 43 is sufficiently high, the amount of unreduced NOx flowing out of the catalyst 43 can be reduced.

(Actual Operation)

Actual operation of the first control apparatus will be explained below.

<Fuel Injection Control>

Figure 5:
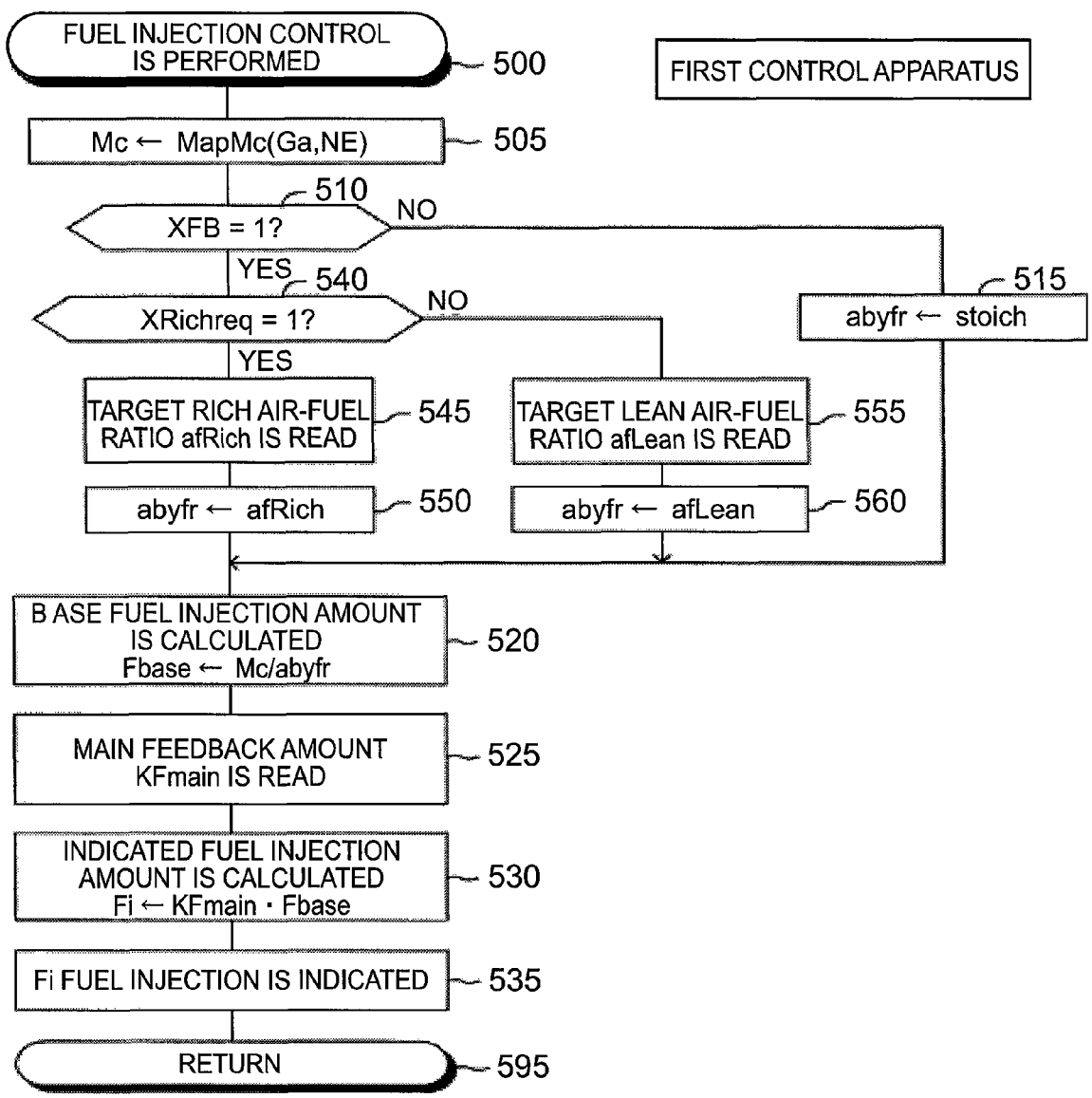
FIG. 5 is a flowchart illustrating the routine executed by a central processing unit (CPU) of the first control apparatus.

The CPU of the first control apparatus repeatedly executes the fuel injection control routine shown in FIG. 5 for a cylinder each time the crank angle of the cylinder becomes a predetermined crank angle before the intake top dead center. The predetermined crank angle is, for example, crank angle 90° before top dead center (BTDC 90° CA). The cylinder for which the crank angle matches the predetermined crank angle can be also referred to as "fuel injection cylinder". By this fuel injection control routine, the CPU calculates the indicated fuel injection amount (final fuel injection amount) Fi and indicates fuel injection.

Where the crank angle of any cylinder matches the predetermined crank angle before the intake top dead center, the CPU starts the processing from step 500, advances to step 505 and acquires "the amount of air taken into a fuel injection cylinder (that is, the in-cylinder intake air amount) Mc" on the basis of "the intake air amount Ga, engine revolution speed NE, and lookup table MapMc (Ga, Ne)". The in-cylinder intake air amount Mc may be calculated by a conventional air model (model created according to physical laws and simulating the behavior or air in the intake passage).

The CPU then advances to step 510 and determines whether or not the value of the feedback control flag XFB is "1". The value of the feedback control flag XFB is set to "1" when the feedback control condition of air-fuel ratio is fulfilled and set to "0" when the feedback control condition is not fulfilled. Further, the value of the feedback control flag XFB is set to "0" in the initial routine. The initial routine is a routine executed by the CPU when the ignition key switch of the vehicle carrying the engine 10 is switched from the OFF position to the ON position.

The feedback control condition of air-fuel ratio is fulfilled, for example, when all of the below-described conditions are fulfilled.

(A1) The upstream air-fuel ratio sensor 66 is activated.
(A2) The downstream air-fuel ratio sensor 67 is activated.
(A3) The load KL of the engine is equal to or less than a threshold load KLfbth.

Where the value of the feedback control flag XFB is not "1", the CPU determines "No" in step 510, advances to step 515, and sets the target air-fuel ratio abyfr to the stoichiometric air-fuel ratio stoich (for example, 14.6).

The CPU then successively performs the processing of the below-described step 520 to step 535, advances to step 595, and temporarily ends the present routine.

In step 520, the CPU calculates the base fuel injection amount Fbase by dividing the in-cylinder intake air amount Mc by the target air-fuel ratio abyfr. The base fuel injection amount Fbase is the feedforward amount of the fuel injection amount necessary for matching the air-fuel ratio of the engine with the target air-fuel ratio abyfr.

In step 525, the CPU reads the main feedback amount KFmain that has been separately computed by a routine which is not shown in the figure. The main feedback amount KFmain is calculated on the basis of conventional proportional integral derivative (PID) control such that the detected upstream air-fuel ratio abyfs matches the target air-fuel ratio abyfr. Therefore, the main feedback amount KFmain is increased when the detected upstream air-fuel ratio abyfs is greater than the target air-fuel ratio abyfr and decreased when the detected upstream air-fuel ratio abyfs is less than the target air-fuel ratio abyfr. The main feedback amount KFmain is set to "1" when the value of the feedback control flag XFB is "0". Further, the main feedback amount KFmain may be set to "1" at all times. Thus, the feedback control using the main feedback amount KFmain is not necessary in the present embodiment.

In step 530, the CPU calculates the indicated fuel injection amount Fi by correcting the base fuel injection amount Fbase by the main feedback amount KFmain. More specifically, the CPU calculates the indicated fuel injection amount Fi by multiplying the fuel injection amount Fbase by the main feedback amount KFmain.

In step 535, the CPU transmits the injection indication signal for causing the "injection of the indicated fuel injection amount Fi" from the "fuel injection valves 33 provided correspondingly to fuel injection cylinders" to the fuel injection valves 33.

As a result, the fuel in an amount necessary for matching the air-fuel ratio of the engine with the target air-fuel ratio abyfr is injected from the fuel injection valves 33 of the fuel injection cylinders. Thus, step 520 to step 535 constitute indicated fuel injection amount control means for "controlling the indicated fuel injection amount Fi so that the air-fuel ratio of the engine matches the target air-fuel ratio abyfr", or "fuel supply amount control means for controlling the amount of fuel supplied to the engine 10 on the basis of the target air-fuel ratio abyfr that has been set".

Meanwhile, where the value of the feedback control flag FXB is "1" at a point of time in which the CPU performs the processing of step 510, the CPU determines "Yes" in step 510, advances to step 540, and determines whether or not the value of the rich request flag XRichreq is "1". The value of the rich request flag XRichreq is set by the routine shown in FIG. 7 described hereinbelow.

Where the value of the rich request flag XRichreq is "1", the CPU determines "Yes" in step 540, advances to step 545, and reads the target rich air-fuel ratio afRich. The target rich air-fuel ratio afRich is separately calculated by the routine shown in FIG. 8 described hereinbelow. Then, the CPU advances to step 550 and sets the target air-fuel ratio abyfr to the target rich air-fuel ratio afRich. The CPU then advances to step 520 and subsequent steps. Therefore, the air-fuel ratio of the engine is matched with the target rich air-fuel ratio afRich.

By contrast, where the value of the rich request flag XRichreq is "0" at a point of time in which the CPU performs the processing of step 540, the CPU determines "No" in step 540, advances to step 555, and reads the target lean air-fuel ratio afLean. The target lean air-fuel ratio afLean is also separately calculated by the routine shown in FIG. 8 described hereinbelow. The CPU then advances to step 560 and sets the target air-fuel ratio abyfr to the target lean air-fuel ratio afLean. The CPU then advances to step 520 and subsequent steps. Therefore, the air-fuel ratio of the engine is matched with the target lean air-fuel ratio afLean.

<Catalyst State Determination>

Figure 6:
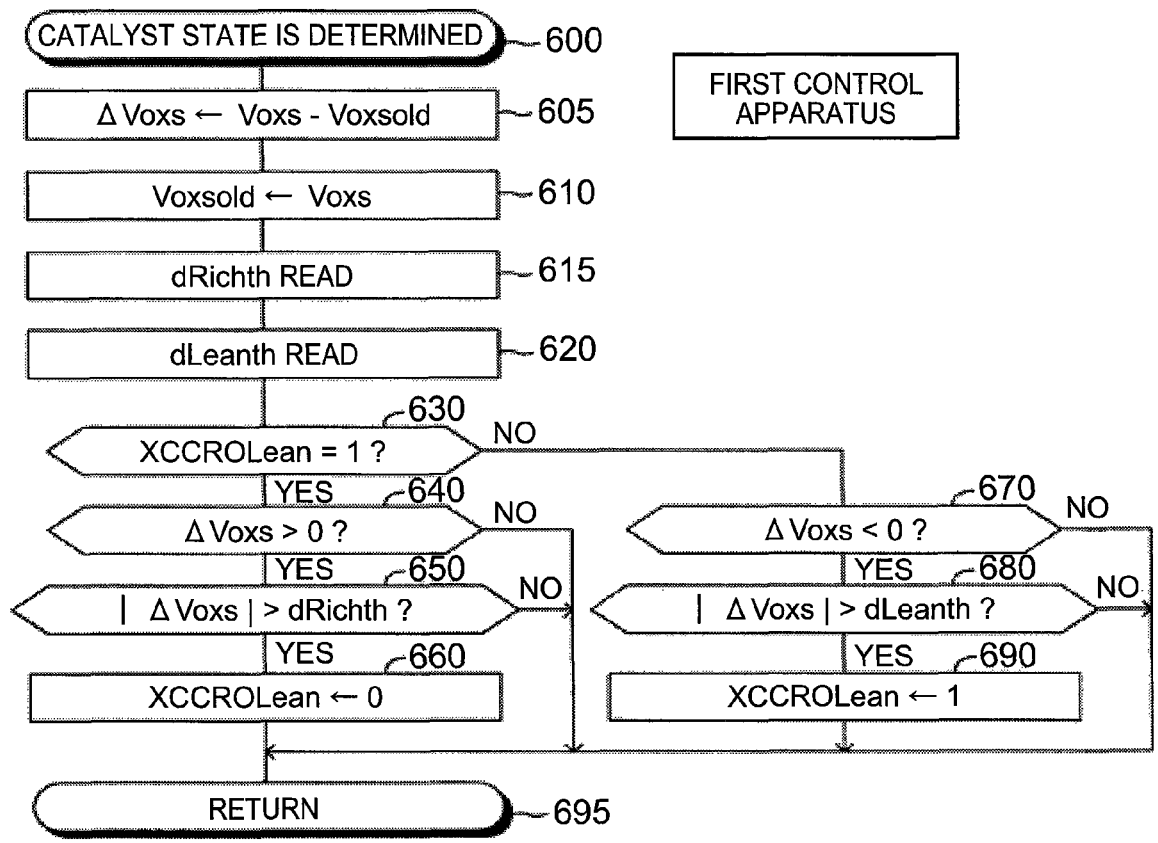
FIG. 6 is a flowchart illustrating the routine executed by the CPU of the first control apparatus.

The CPU repeatedly executes the "catalyst state determination routine", which is shown by the flowchart in FIG. 6, for each elapsed predetermined time interval ts. Therefore, where the predetermined timing is reached, the CPU starts the processing from step 600, advances to step 605, and calculates the variation amount ΔVoxs of the output value Voxs per the predetermined time ts (unit time) by subtracting the "previous output value Voxsold of the downstream air-fuel ratio sensor 67" from the "present output value Voxs of the downstream air-fuel ratio sensor 67".

Then, the CPU advances to step 610, and stores the present output value Voxs as the "previous output value Voxsold". Thus, the previous output value Voxsold is the output value Voxs (the output value Voxs obtained when the previous cycle of the present routine has been executed) at a point of time preceding the present point of time by the predetermined time ts. The variation amount ΔVoxs is also referred to as "variation rate ΔVoxs".

The CPU then advances to step 615 and reads the rich determination threshold dRichth. In the present example, the rich determination threshold dRichth is set to a constant value. The CPU then advances to step 620 and reads the lean determination threshold dLeanth. In the present example, the lean determination threshold dLeanth is set to a constant value.

The CPU then advances to step 630 and determines whether or not the value of the catalyst lean state display flag XCCROLean is "1". The value of the catalyst lean state display flag XCCROLean is set to "1" in the above-described initial routine. Further, the value of the catalyst lean state display flag XCCROLean is set to "0" when the state of the catalyst 43 is determined to be the oxygen shortage state (rich state) on the basis of the output value Voxs of the downstream air-fuel ratio sensor 67, and set to "1" when the state of the catalyst 43 is determined to be the oxygen excess state (lean state) on the basis of the output value Voxs of the downstream air-fuel ratio sensor 67.

Now, let us assume that the value of the catalyst lean state display flag XCCROLean is "1". In this case, the CPU determines "Yes" in step 630, advances to step 640 and determines whether or not the variation rate ΔVoxs is positive. Thus, the CPU determines whether or not the output value Voxs has increased. In this case, where the variation rate ΔVoxs is not positive, the CPU determines "No" in step 640, directly advances to step 695, and temporarily ends the present routine.

Incidentally, where the catalyst lean state display flag XCCROLean is "1", the value of the rich request flag XRichreq is set to "1" by the routine shown in FIG. 7 described hereinbelow, thereby setting the target air-fuel ratio abyfr to the target rich air-fuel ratio afRich (see step 540 to step 550 in FIG. 5). Therefore, the oxygen adsorption amount in the catalyst 43 gradually decreases and, at a certain point of time, the unburned matter starts flowing out of the catalyst 43.

As a result, the variation rate ΔVoxs has a positive value. Where the variation rate ΔVoxs has a positive value, the CPU determines "Yes" in step 640, advances to step 650, and determines whether or not the absolute value |ΔVoxs| of the variation rate ΔVoxs is greater than the rich determination threshold dRichth. In this case, where the absolute value |ΔVoxs| is equal to or less than the rich determination threshold dRichth, the CPU determines "No" in step 650, directly advances to step 695, and temporarily ends the present routine.

Where the absolute value |ΔVoxs| of the variation rate ΔVoxs is greater than the rich determination threshold dRichth at a point of time in which the CPU executes the processing of step 650, the CPU determines "Yes" in step 650, advances to step 660 and sets the value of the catalyst lean state display flag XCCROLean to "0". Thus, when the output value Voxs increases and the absolute value |ΔVoxs| of the variation rate ΔVoxs is greater than the rich determination threshold dRichth, the CPU determines that "the state of the catalyst 43 is the oxygen shortage state" and sets the value of the catalyst lean state display flag XCCROLean to "0".

Where the CPU restarts the processing from step 600 in this state (that is, the state in which the value of the catalyst lean state display flag XCCROLean has been set to "0"), the CPU advances to step 630 via step 605 to step 620, determines "No" in step 630, and advances to step 670.

The CPU determines in step 670 as to whether or not the variation rate ΔVoxs is negative. Thus, the CPU determines whether or not the output value Voxs has decreased. In this case, where the variation rate ΔVoxs is not negative, the CPU determines "No" in step 670, directly advances to step 695, and temporarily ends the present routine.

Incidentally, where the catalyst lean state display flag XCCROLean is "0", the value of the rich request flag XRichreq is set to "0" by the routine shown in FIG. 7 described hereinbelow, thereby setting the target air-fuel ratio abyfr to the target lean air-fuel ratio afLean (see step 540, step 555 and step 560 in FIG. 5). Therefore, the oxygen adsorption amount in the catalyst 43 gradually increases and, at a certain point of time, oxygen starts flowing out of the catalyst 43.

As a result, the variation rate ΔVoxs has a negative value. Where the variation rate ΔVoxs has a negative value, the CPU determines "Yes" in step 670, advances to step 680, and determines whether or not the absolute value |ΔVoxs| of the variation rate ΔVoxs is greater than the lean determination threshold dLeanth. In this case, where the absolute value |ΔVoxs| is equal to or less than the lean determination threshold dLeanth, the CPU determines "No" in step 680, directly advances to step 695, and temporarily ends the present routine.

By contrast, where the absolute value |ΔVoxs| of the variation rate ΔVoxs is greater than the lean determination threshold dLeanth, the CPU determines "Yes" in step 680, advances to step 690, and sets the catalyst lean state display flag XCCROLean to "1". Thus, when the output value Voxs decreases and the absolute value |ΔVoxs| of the variation rate ΔVoxs thereof is greater than the lean determination threshold dLeanth, the CPU determines that "the state of the catalyst 43 is the oxygen excess state" and sets the catalyst lean state display flag XCCROLean to "1".

Where the output value Voxs becomes greater than the rich determination threshold VRichth when the catalyst lean state display flag XCCROLean is "1", the CPU may set the value of the catalyst lean state display flag XCCROLean to "0". Likewise, where the output value Voxs becomes less than the lean determination threshold VLeanth when the catalyst lean state display flag XCCROLean is "0", the value of the catalyst lean state display flag XCCROLean may be set to "1". In this case, the rich determination threshold VRichth may be a value equal to or less than a central value Vmid. The lean determination threshold VLeanth may be equal to or greater than the central value Vmid.

The value of the catalyst lean state display flag XCCROLean is thus set alternately to "1" and "0" on the basis of the output value Voxs of the downstream air-fuel ratio sensor 67. The rich request flag XRichreq is then set according to the catalyst lean state display flag XCCROLean, and the target air-fuel ratio abyfr is determined according to the rich request flag XRichreq.

<Rich Request Flag Setting (Determination of Requested Air-Fuel Ratio)>

Figure 7:
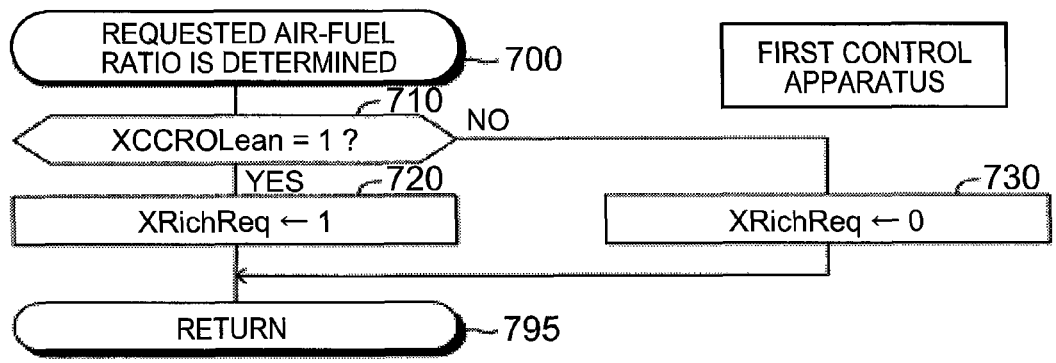
FIG. 7 is a flowchart illustrating the routine executed by the CPU of the first control apparatus.

The CPU executes the requested air-fuel ratio determination routine shown in FIG. 7 for each elapsed predetermined time interval. Therefore, at a predetermined timing, the CPU starts the processing from step 700, advances to step 710, and determines whether or not the catalyst lean state display flag XCCROLean is "1". In this case, where the catalyst lean state display flag XCCROLean is "1", the CPU advances to step 720, and sets the value of the rich request flag XRichreq to "1". Thus, the CPU determines that the "requested air-fuel ratio" is the rich air-fuel ratio and that the rich request has been generated. The CPU then advances to step 795 and temporarily ends the present routine.

By contrast, where the catalyst lean state display flag XCCROLean is "0", at a point of time in which the CPU executes the processing of step 710, the CPU advances to step 730 and sets the rich request flag XRichreq to "0". Thus, the CPU determines that the "requested air-fuel ratio" is the lean air-fuel ratio and that the lean request has been generated. The CPU then advances to step 795 and temporarily ends the present routine.

<Target Air-Fuel Ratio Calculation>

Figure 8:
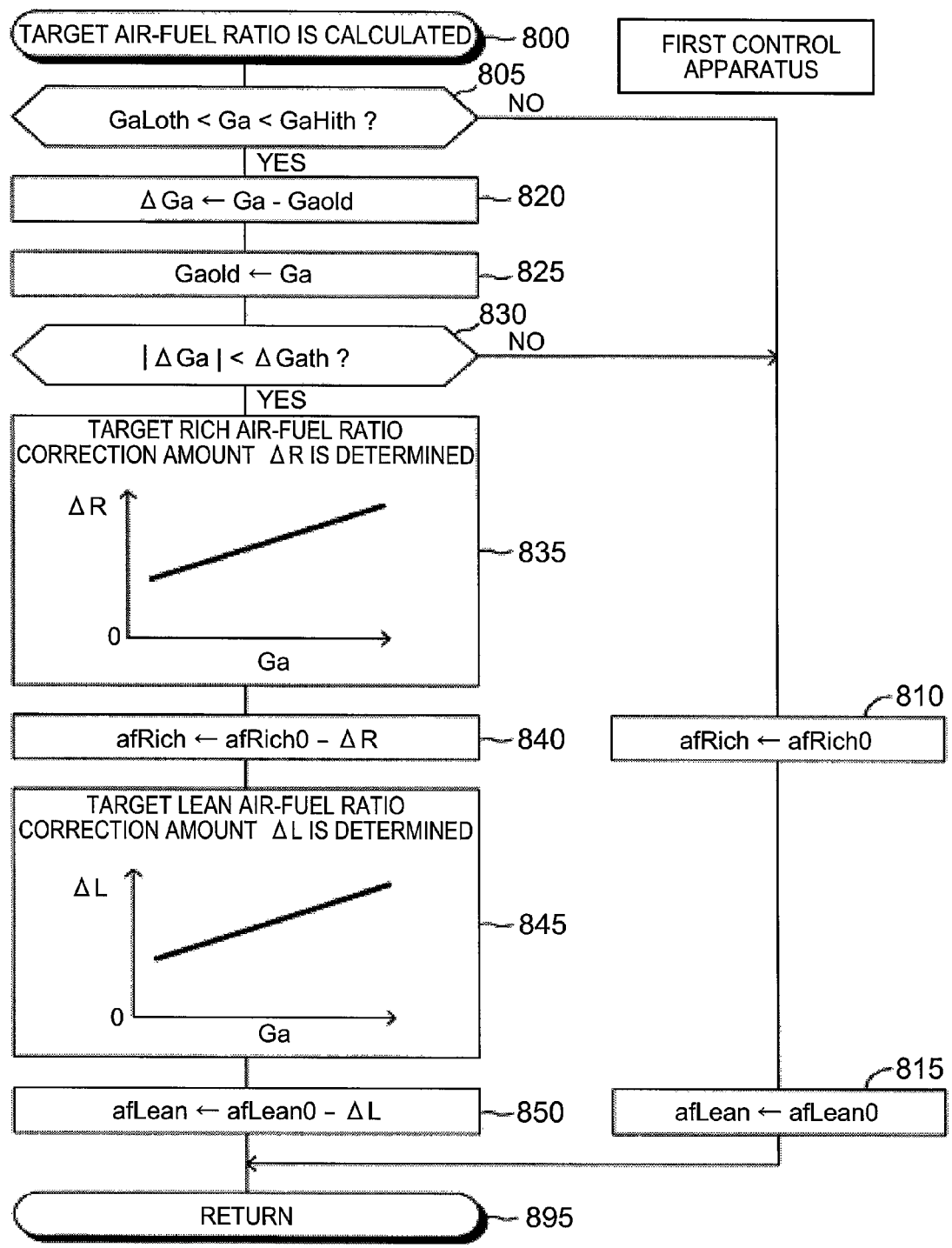
FIG. 8 is a flowchart illustrating the routine executed by the CPU of the first control apparatus.

The CPU executes the target air-fuel ratio calculation routine shown in FIG. 8 for each elapsed predetermined time interval. Therefore, at a predetermined timing, the CPU starts the processing from step 800, advances to step 805 and determines whether or not the above-described Condition 1 is fulfilled. Thus, the CPU determines whether or not the intake air amount Ga is greater than the low-side air amount threshold GaLoth and less than the high-side air amount threshold GaHith.

Now, let us assume that the determination condition of step 805 is not fulfilled. In this case, the CPU determines "No" in step 805, successively performs the processing of the below-described step 810 to step 815 and then advances to step 895 and temporarily ends the present routine.

In step 810, the CPU sets the value of the target rich air-fuel ratio afRich to the reference target rich air-fuel ratio afRich0. The reference target rich air-fuel ratio afRich0 is a value (for example, 14.2) which is less by the predetermined positive value A than the stoichiometric air-fuel ratio stoich.

In step 815, the CPU sets the value of the target lean air-fuel ratio afLean to the reference target lean air-fuel ratio afLean0. The reference target lean air-fuel ratio afLean0 is a value (for example, 15.0) which is greater by the predetermined positive value A than the stoichiometric air-fuel ratio stoich.

By contrast, where the intake air amount Ga is greater than the low-side air amount threshold GaLoth and less than the high-side air amount threshold GaHith at a point of time in which the CPU executes the processing of step 805, the CPU determines "Yes" in step 805, advances to step 820, and calculates the intake air amount variation amount ΔGa per the predetermined time ts (unit time) by subtracting the "previous intake air amount Gaold" from the "present intake air amount Ga".

The CPU then advances to step 825 and stores the present intake air amount Ga as the "previous intake air amount Gaold". Thus, the previous intake air amount Gaold is the intake air amount Ga (intake air amount Ga obtained when the previous cycle of the present routine has been executed) at a point of time preceding the present point of time by the predetermined time ts.

Then, the CPU advances to step 830 and determines whether or not the absolute value |ΔGa| of the intake air amount variation amount ΔGa is less than the predetermined variation amount threshold ΔGath. Thus, the CPU determines whether or not Condition 2 is fulfilled. In this case, where the absolute value |ΔGa| is equal to or greater than the variation amount threshold ΔGath, the CPU determines "No" in step 830, executes the processing of step 810 and step 815 and temporarily ends the present routine. Therefore, in this case, the target rich air-fuel ratio afRich is set to the reference target rich air-fuel ratio afRich0, and the target lean air-fuel ratio afLean is set to the reference target lean air-fuel ratio afLean0.

Meanwhile, where the absolute value |ΔGa| of the intake air amount variation amount ΔGa is less than the predetermined variation amount threshold ΔGath at a point of time in which the CPU executes the processing of step 830, the CPU determines "Yes" in step 830, successively performs the processing of the below-described step 835 to step 850 and then advances to step 895 and temporarily ends the present routine.

In step 835, the CPU determines the target rich air-fuel ratio correction amount ΔR on the basis of the intake air amount Ga. The target rich air-fuel ratio correction amount ΔR is determined to increase with the increase in the intake air amount Ga.

In step 840, the CPU sets the target rich air-fuel ratio afRich to a value (afRich0-ΔR) obtained by subtracting the target rich air-fuel ratio correction amount ΔR from the reference target rich air-fuel ratio afRich0. As a result, the target rich air-fuel ratio afRich is calculated as an air-fuel ratio that decreases so as to withdraw from the stoichiometric air-fuel ratio stoich as the intake air amount Ga increases.

In step 845, the CPU determines the target lean air-fuel ratio correction amount ΔL on the basis of the intake air amount Ga. The target lean air-fuel ratio correction amount ΔL is determined to increase with the increase in the intake air amount Ga.

In step 850, the CPU sets the target lean air-fuel ratio afLean to a value (afLean0-ΔL) obtained by subtracting the target lean air-fuel ratio correction amount ΔL from the reference target lean air-fuel ratio afLean0. As a result, the target lean air-fuel ratio afLean is calculated as an air-fuel ratio that decreases so as to approach the stoichiometric air-fuel ratio stoich as the intake air amount Ga increases. However, the target lean air-fuel ratio correction amount ΔL is determined such that the value (afLean0-ΔL) becomes greater than the stoichiometric air-fuel ratio stoich.

As described hereinabove, with the first control apparatus, when the above-described predetermined conditions (Condition 1 and Condition 2) are fulfilled (that is, when "Yes" is determined in both step 805 and step 830), it is determined that the inflow of a large amount of NOx into the catalyst 43 can be predicted.

With the first control apparatus the target lean air-fuel ratio afLean is decreased by the target lean air-fuel ratio correction amount ΔL by comparison with the "case in which the predetermined condition is not fulfilled" (step 845 and step 850 in FIG. 8) and the target rich air-fuel ratio afRich is decreased by the target rich air-fuel ratio correction amount ΔR by comparison with the "case in which the predetermined condition is not fulfilled" (step 835 and step 840 in FIG. 8). As a result, the concentration of the reducing agent in the catalyst 43 is increased and therefore the NOx reduction rate when NOx flows into the catalyst is increased. As a consequence, even when the engine 10 is thereafter accelerated and a large amount of NOx flows into the catalyst 43, the amount of the unreduced NOx flowing out of the catalyst 43 can be reduced.

Second Embodiment

The control apparatus for an internal combustion engine according to the second embodiment of the invention (referred to hereinbelow as "second control apparatus") will be explained below.

The second control apparatus differs from the first control apparatus only in that the period of time in which the target air-fuel ratio abyfr is maintained at the target rich air-fuel ratio afRich is relatively extended, instead of changing the target rich air-fuel ratio afRich and the target lean air-fuel ratio afLean, when the predetermined conditions are fulfilled.

More specifically, similarly to the first control apparatus, the second control apparatus sets the target air-fuel ratio abyfr to the target rich air-fuel ratio afRich when the value of the rich request flag XRichreq is "1", and sets the target air-fuel ratio abyfr to the target lean air-fuel ratio afLean when the value of the rich request flag XRichreq is "0".

Figure 9:
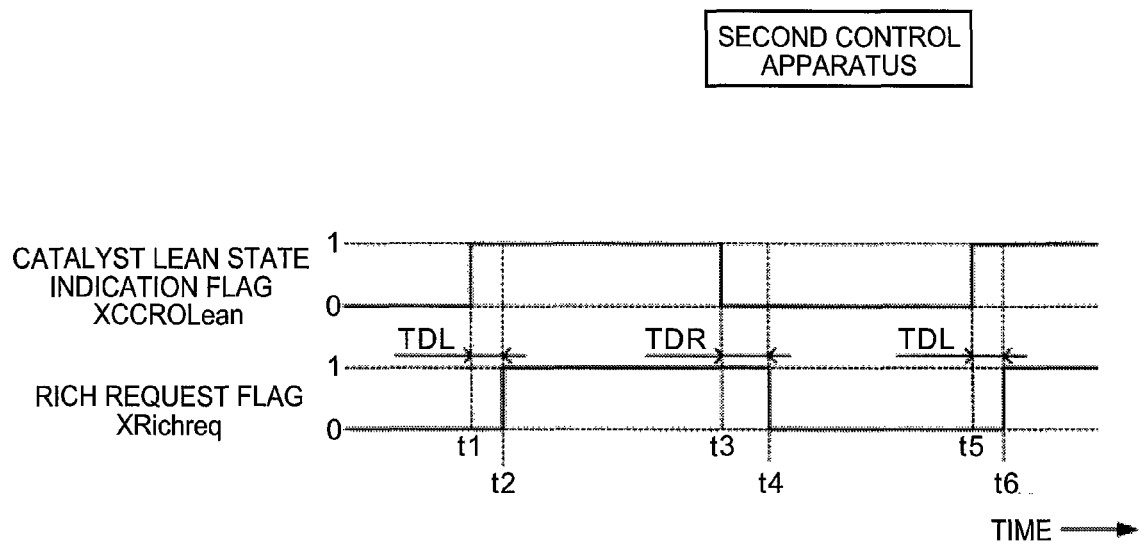
FIG. 9 is a time chart illustrating the catalyst lean state display flag and rich request flag that are used by the control apparatus (second control apparatus) according to the second embodiment of the invention.

Further, as shown in FIG. 9, the second control apparatus changes the rich request flag XRichreq from "0" to "1" at a point of time at which the lean delay time TDL elapses from the point of time (timing t1, t5) at which the value of the catalyst lean state display flag XCCROLean has changed from "0" to "1". In addition, the second control apparatus changes the rich request flag XRichreq from "1" to "0" at a point of time at which the rich delay time TDR elapses from the point of time (timing t3) at which the value of the catalyst lean state display flag XCCROLean has changed from "1" to "0". Therefore, because the rich delay time TDR is extended and/or the lean delay time TDL is shortened, the period of time in which the target air-fuel ratio abyfr is set to the target rich air-fuel ratio afRich is extended, thereby making it possible to shift the average value of the air-fuel ratio of the exhaust gas flowing into the catalyst 43 to the rich side. Accordingly, when the predetermined conditions are fulfilled, the second control apparatus extends the rich delay time TDR or shortens the lean delay time TDL. As a result, when the predetermined conditions are fulfilled, the second control apparatus increases the concentration of the reducing agent inside the catalyst 43.

(Actual Operation)

The CPU of the second control apparatus executes the routines shown in FIGS. 5 and 6 in the same manner as the CPU of the first control apparatus. However, the target rich air-fuel ratio afRich that is read out in step 545 shown in FIG. 5 has a constant value (for example, 14.2), and the target lean air-fuel ratio afLean that is read out in step 555 shown in FIG. 5 also has a constant value (15.0).

Figure 10:
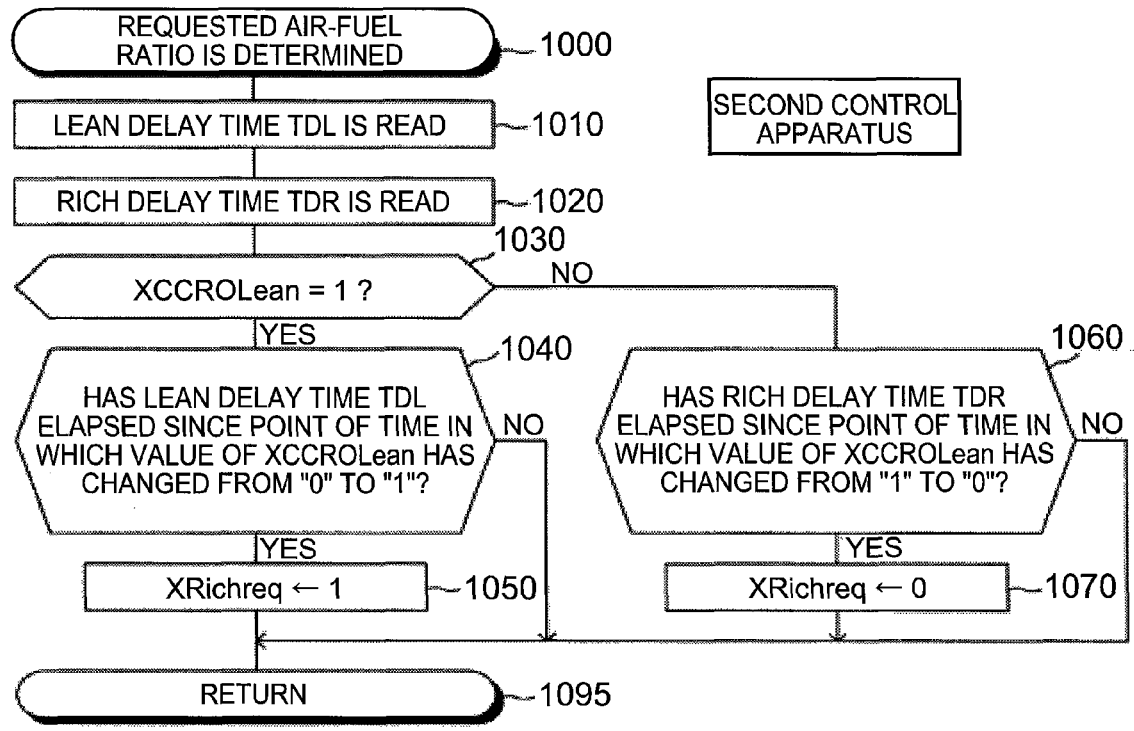
FIG. 10 is a flowchart illustrating the routine executed by the CPU of the second control apparatus.

Further, the CPU of the second control apparatus executes the requested air-fuel ratio determination routine shown in FIG. 10 for each elapsed predetermined time interval. Therefore, where the predetermined timing is reached, the CPU starts the processing from step 1000, advances to step 1010, and reads the lean delay time TDL. The lean delay time TDL is calculated by the routine shown in FIG. 11 described hereinbelow. The CPU then advances to step 1020 and reads the rich delay time TDR. The rich delay time TDR is calculated by the routine shown in FIG. 11 described hereinbelow.

The CPU then advances to step 1030 and determines whether or not the value of the catalyst lean state display flag XCCROLean is "1". In this case, where the value of the catalyst lean state display flag XCCROLean is "1", the CPU determines "Yes" in step 1030, advances to step 1040, and determines whether or not the lean delay time TDL has elapsed since the point of time at which the value of the catalyst lean state display flag XCCROLean has changed from "0" to "1".

Where the lean delay time TDL has not elapsed, the CPU determines "No" in step 1040, directly advances to step 1095, and temporarily ends the present routine. In this case, the value of the rich request flag XRichreq is not changed.

By contrast, where the lean delay time TDL has elapsed at a point of time in which the CPU executes the processing of step 1040, the CPU determines "Yes" in step 1040, advances to step 1050, and sets the rich request flag XRichreq to "1". As a result, the target air-fuel ratio abyfr is changed from the target lean air-fuel ratio afLean to the target rich air-fuel ratio afRich at a point of time (or thereafter) in which the lean delay time TDL has elapsed since the point of time in which the value of the catalyst lean state display flag XCCROLean has changed from "0" to "1". Then, the CPU advances to step 1095 and temporarily ends the present routine.

Meanwhile, when the value of the catalyst lean state display flag XCCROLean is "0" at a point of time in which the CPU executes the processing of step 1030, the CPU determines "No" in step 1030, advances to step 1060, and determines whether or not the rich delay time TDR has elapsed since a point of time in which the value of the catalyst lean state display flag XCCROLean has changed from "1" to "0".

Where the rich delay time TDR has not elapsed, the CPU determines "No" in step 1060, directly advances to step 1095, and temporarily ends the present routine. In this case, the value of the rich request flag XRichreq is not changed.

By contrast, where the rich delay time TDR has elapsed at a point of time in which the CPU executes the processing of step 1060, the CPU determines "Yes" in step 1060, advances to step 1070, and sets the rich request flag XRichreq to "0". As a result, the target air-fuel ratio abyfr is changed from the target rich air-fuel ratio afRich to the target lean air-fuel ratio afLean at a point of time (or thereafter) in which the rich delay time TDR has elapsed since the point of time in which the value of the catalyst lean state display flag XCCROLean has changed from "1" to "0". Then, the CPU advances to step 1095 and temporarily ends the present routine.

Figure 11:
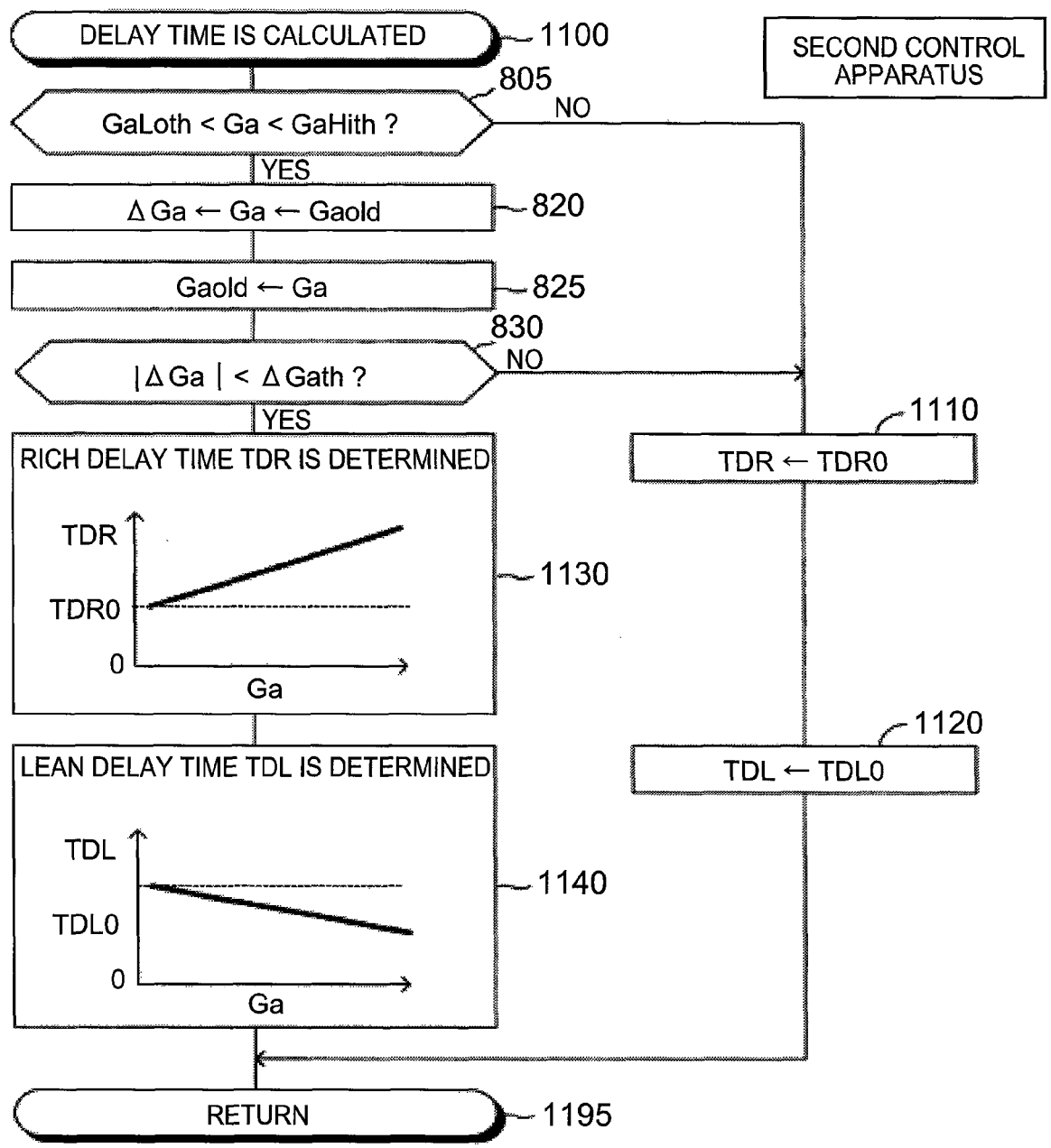
FIG. 11 is a flowchart illustrating the routine executed by the CPU of the second control apparatus.

Then, the CPU executes the delay time calculation routine shown in FIG. 11 for each elapsed predetermined time interval. Those of steps shown in FIG. 11 which are also shown in FIG. 8 are assigned with reference numerals same as those of the steps shown in FIG. 8. Detailed explanation of those steps is herein omitted as appropriate.

When the above-described predetermined conditions are not fulfilled, the CPU advances to step 1110 and sets the rich delay time TDR to a constant reference rich delay time TDR0. Then, the CPU advances to step 1120, sets the lean delay time TDL to a constant reference lean delay time TDL0, advances to step 1195, and temporarily ends the present routine.

By contrast, where the above-described predetermined conditions are fulfilled, the CPU advances to step 1130 and determines the rich delay time TDR on the basis of the intake air amount Ga. More specifically, the rich delay time TDR is determined to increase within a range equal to or greater than the reference rich delay time TDR0 with the increase in the intake air amount Ga.

The CPU then advances to step 1140 and determines the lean delay time TDL on the basis of the intake air amount Ga. More specifically, the lean delay time TDL is determined to decrease within a range equal to or less than the reference lean delay time TDL0 with the increase in the intake air amount Ga.

As described hereinabove, the second control apparatus includes the catalyst state determination means for determining that a state of the catalyst 43 is the oxygen excess state when the variation amount $\Delta$Voxs of the output value Voxs of the downstream air-fuel ratio sensor 67 per unit time has a negative value and the absolute value $|\Delta Voxs|$ thereof is greater than a lean determination threshold dLeanth (step 670 to step 690 in FIG. 6), and determining that the state of the catalyst 43 is an oxygen shortage state when the variation amount $\Delta$Voxs has a positive value and the absolute value $|\Delta Voxs|$ thereof is greater than a rich determination threshold dRichth (step 640 to step 650 in FIG. 6)

The second control apparatus also includes the target air-fuel ratio setting means and the fuel supply amount control means for controlling the fuel amount supplied to the engine on the basis of the target air-fuel ratio that has been set by the target air-fuel ratio setting means.

The target air-fuel ratio setting means sets the target air-fuel ratio abyfr to "the target rich air-fuel ratio afRich, which is less than the stoichiometric air-fuel ratio", when "the lean delay time TDL, which is a predetermined delay time inclusive of 0" has elapsed since a point of time at which the state of the catalyst 43 has been determined by the catalyst state determination means to change from the oxygen shortage state to the oxygen excess state (step 1040 and step 1050 in FIG. 10 and step 540 to step 550 in FIG. 5), and sets the target air-fuel ratio abyfr to "the target lean air-fuel ratio afLean, which is greater than the stoichiometric air-fuel ratio," when "the rich delay time TDR, which is a predetermined delay time inclusive of 0" has elapsed since a point of time at which the state of the catalyst 43 has been determined by the catalyst state determination means to change from the oxygen excess state to the oxygen shortage state (step 1060 and step 1070 in FIG. 10 and step 540, step 555 and step 560 in FIG. 5).

The fuel supply amount control means controls the fuel amount (fuel injection amount) supplied to the engine 10 on the basis of the target air-fuel ratio abyfr that has been set (step 520 to step 535 in FIG. 5, fuel injection valve 33).

Further, the target air-fuel ratio setting means is also configured to set the rich delay time TDR when the predetermined conditions are fulfilled (see the determination of "Yes" both in step 805 and in step 830 in FIG. 11) to a time longer than the rich delay time TDR (=reference rich delay time TDR0) when the predetermined conditions are not fulfilled (step 1130 in FIG. 11). Where the rich delay time TDR is thus set, the lean delay time TDL may be "0" or a constant value at all times.

The target air-fuel ratio setting means is also configured to set the lean delay time TDL when the predetermined conditions are fulfilled (see the determination of "Yes" both in step 805 and in step 830 in FIG. 11) to a time shorter than the lean delay time TDL (=reference lean delay time TDL0) when the predetermined conditions are not fulfilled (step 1140 in FIG. 11). Where the lean delay time TDL is thus set, the rich delay time TDR may be "0" or a constant value.

Therefore, with the second control apparatus, the period of time in which the target air-fuel ratio is set to a rich air-fuel ratio is extended by "the extension time of the rich delay time TDR" and/or "the reduction time of the lean delay time TDL". Therefore, the average value of the air-fuel ratio of the engine 10 (therefore, the average value of the air-fuel ratio of the catalyst inflow gas, which is the gas flowing into the catalyst) decreases (becomes richer) with respect to the stoichiometric air-fuel ratio. Therefore, when the predetermined conditions are fulfilled, the state of the catalyst 43 can be set to the "state with the increased NOx reduction rate".

Third Embodiment

The control apparatus for an internal combustion engine according to the third embodiment of the invention (referred to hereinbelow as "third control apparatus") will be explained below.

The third control apparatus differs from the first control apparatus only in that the period of time in which the state of the catalyst 43 is determined to be the oxygen excess state is relatively extended by increasing the rich determination threshold dRichth, instead of changing the target rich air-fuel ratio afRich and target lean air-fuel ratio afLean, when the predetermined conditions are fulfilled.

More specifically, similarly to the first control apparatus, the third control apparatus sets the target air-fuel ratio abyfr to the target rich air-fuel ratio afRich when the value of the rich request flag XRichreq is "1" and sets the target air-fuel ratio abyfr to the target lean air-fuel ratio afLean when the value of the rich request flag XRichreq is "0".

Figure 12:
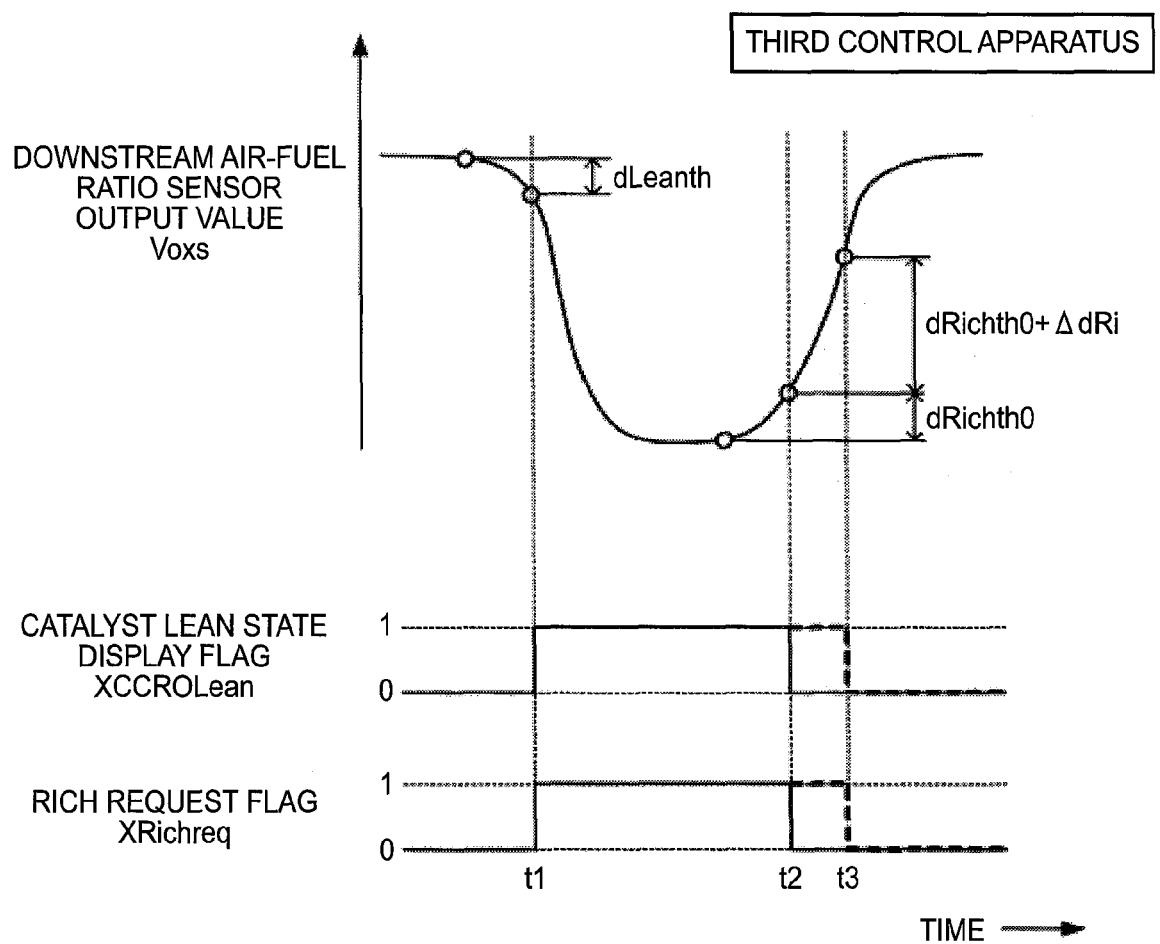
FIG. 12 is a time chart illustrating the output value of the downstream air-fuel ratio sensor shown in FIG. 1 and the catalyst lean state display flag and rich request flag that are used by the control apparatus (third control apparatus) according to the third embodiment of the invention.

Further, as shown in FIG. 12, when the above-described predetermined conditions are not fulfilled, the third control apparatus sets the rich determination threshold dRichth to the reference rich determination threshold dRichth0. For this purpose, in the example shown in FIG. 12, the values of the catalyst lean state display flag XCCROLean and the rich request flag XRichreq are changed from "1" to "0" at a timing t2. Thus, when it is determined that the state of the catalyst 43 is the oxygen excess state, it is determined that the state of the catalyst 43 has changed to the oxygen shortage state at a point of time at which the output value Voxs of the downstream air-fuel ratio sensor 67 slightly increases, and at this point of time, the target air-fuel ratio abyfr is switched to the target lean air-fuel ratio afLean.

By contrast, when the above-described predetermined conditions are fulfilled, the third control apparatus sets the rich determination threshold dRichth to "a value (dRichth0+ΔdRi) which is obtained by adding a positive correction amount ΔdRi to the reference rich determination threshold dRichth0". As a result, even when the variation mode of the output value Voxs of the downstream air-fuel ratio sensor 67 is the same, the point of time at which the values of the catalyst lean state display flag XCCROLean and the rich request flag XRichreq are changed from "1" to "0" is a timing t3 which is later than the timing t2. Thus, when the state of the catalyst 43 is determined to be the oxygen excess state, it is determined that the state of the catalyst 43 has changed to the oxygen shortage state at the timing t3 at which the output value Voxs of the downstream air-fuel ratio sensor 67 has increased by "the amount which is greater than the reference rich determination threshold dRichth0" per unit time, and the target air-fuel ratio abyfr is switched to the target lean air-fuel ratio afLean at this point of time. As a result, the target air-fuel ratio abyfr is set to the target rich air-fuel ratio afRich longer by the time corresponding to the period of time from the timing t2 to the timing t3. As a consequence, when the above-described predetermined conditions are fulfilled, the third control apparatus increases the concentration of the reducing agent in the catalyst 43.

(Actual Operation)

The CPU of the third control apparatus executes the routines shown in FIGS. 5 to 7 in the same manner as the CPU of the first control apparatus. However, the target rich air-fuel ratio afRich read in step 545 in FIG. 5 is a constant value (for example, 14.2), and the target lean air-fuel ratio afLean read in step 555 in FIG. 5 is a constant value (15.0).

Figure 13:
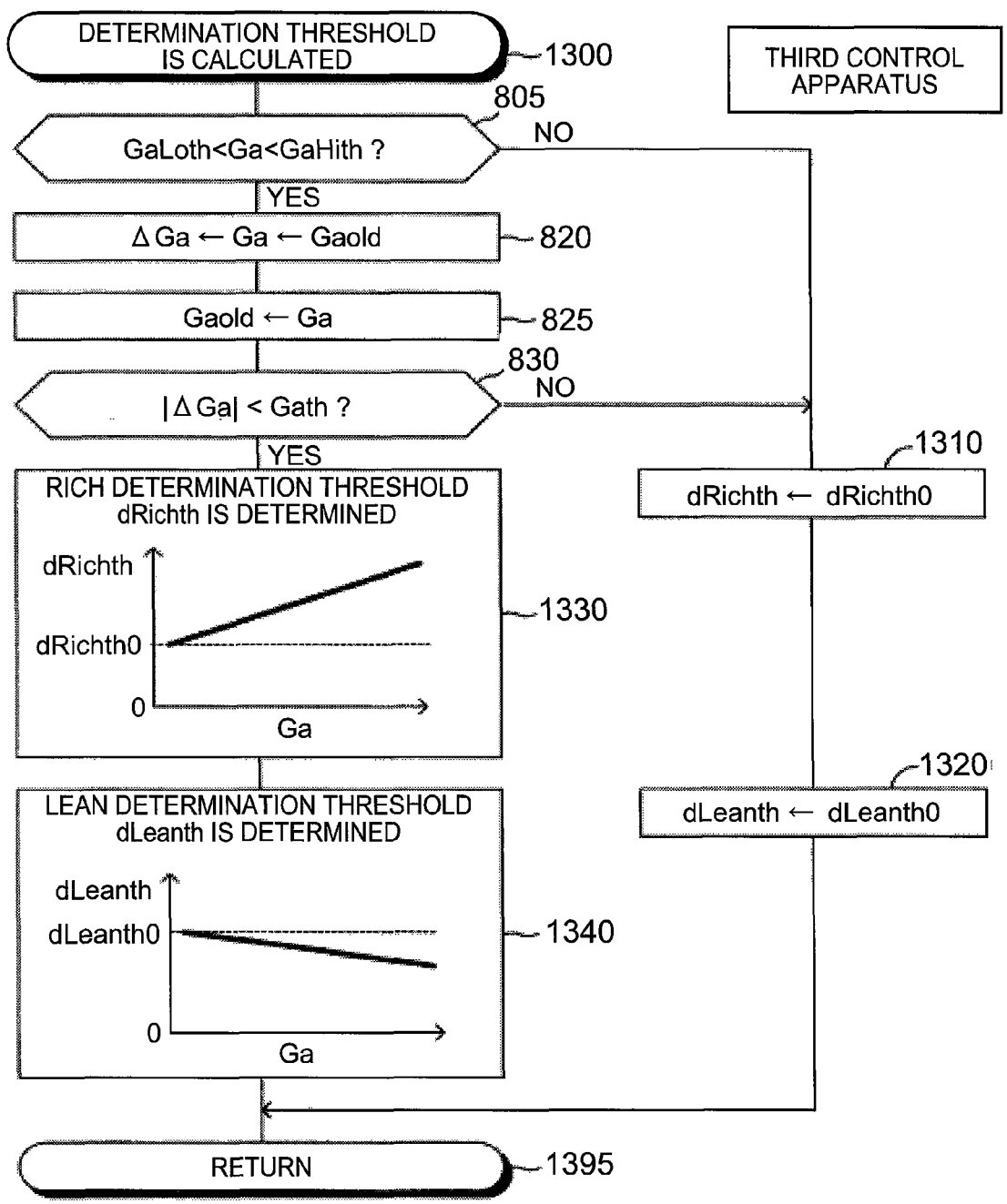
FIG. 13 is a flowchart illustrating the routine executed by the CPU of the third control apparatus.

Further, the CPU of the third control apparatus executes the determination threshold calculation routine shown in FIG. 13 for each elapsed predetermined time interval. The rich determination threshold dRichth and the lean determination threshold dLeanth that are read in step 615 and step 620 in FIG. 6 are calculated by this routine. Those of steps shown in FIG. 13 which are also shown in FIG. 8 are assigned with reference numerals same as those of the steps shown in FIG. 8. Detailed explanation of those steps is herein omitted as appropriate.

When the above-described predetermined conditions are not fulfilled, the CPU advances to step 1310 shown in FIG. 13 and sets the rich determination threshold dRichth to a constant reference rich determination threshold dRichth0. The CPU then advances to step 1320, sets the lean determination threshold dLeanth to a constant reference lean determination threshold dLeanth0, advances to step 1395, and temporarily ends the present routine.

By contrast, where the above-described predetermined conditions are fulfilled, the CPU advances to step 1330 and determines the rich determination threshold dRichth on the basis of the intake air amount Ga. More specifically, the rich determination threshold dRichth is determined to increase within a range equal to or greater than the reference rich determination threshold dRichth0 with the increase in the intake air amount Ga. In other words, the CPU determines a positive correction amount $\Delta$dRi, which increases with the increase in the intake air amount Ga, and sets "the value (dRichth0+$\Delta$dRi) obtained by adding the positive correction amount $\Delta$dRi to the reference rich determination threshold dRichth0" as the rich determination threshold dRichth.

The CPU then advances to step 1340 and determines the lean determination threshold dLeanth on the basis of the intake air amount Ga. More specifically, the lean determination threshold dLeanth is determined to decrease within a range equal to or less than the reference lean determination threshold dLeanth0 with the increase in the intake air amount Ga. In other words, the CPU determines a positive correction amount $\Delta$dLi, which increases with the increase in the intake air amount Ga, and sets "the value (dLeanth0−$\Delta$dLi) obtained by subtracting the positive correction amount $\Delta$dLi from the reference lean determination threshold dLeanth0" as the lean determination threshold dLeanth. The lean determination threshold dLeanth may have a constant value (reference lean determination threshold dLeanth0). Further, when the lean determination threshold dLeanth can vary, e.g., on the basis of the processing of step 1340, the rich determination threshold dRichth may have a constant value (reference rich determination threshold dRichth0). The CPU then advances to step 1395 and temporarily ends the present routine.

As described hereinabove, the third control apparatus includes "the target air-fuel ratio setting means and the fuel supply amount control means" of the second control apparatus. Further, the target air-fuel ratio setting means of the third control apparatus is configured to set the rich determination threshold dRichth obtained when the predetermined conditions are fulfilled to a value greater than that of the rich determination threshold dRichth (=reference rich determination threshold dRichth0) obtained when the predetermined conditions are not fulfilled (step 1330 in FIG. 13).

The target air-fuel ratio setting means of the third control apparatus is also configured to set the lean determination threshold dLeanth obtained when the predetermined conditions are fulfilled to a value less than that of the lean determination threshold dLeanth (=reference lean determination threshold dLeanth0) obtained when the predetermined conditions are not fulfilled (step 1340 in FIG. 13).

Therefore, with the third control apparatus, when the predetermined conditions are fulfilled, the period of time in which the state of the catalyst 43 is determined to be the oxygen shortage state becomes shorter and the period of time in which the state of the catalyst 43 is determined to be the oxygen excess state becomes longer. Thus, when the predetermined conditions are fulfilled, the period of time in which the target air-fuel ratio is set to the target rich air-fuel ratio afRich becomes relatively long. Therefore, the average value of the air-fuel ratio of the engine 10 (therefore, the average value of the air-fuel ratio of the catalyst inflow gas, which is the gas flowing into the catalyst) decreases (becomes richer) with respect to the stoichiometric air-fuel ratio. As a result, when the predetermined conditions are fulfilled, the catalyst 43 state can be set to the "state with the increased NOx reduction rate".

Fourth Embodiment

The control apparatus for an internal combustion engine according to the fourth embodiment of the invention (referred to hereinbelow as "fourth control apparatus") will be explained below.

By contrast with the first to third control apparatuses, the fourth control apparatus controls the air-fuel ratio of the engine so that the temperature of the catalyst 43 rises when the predetermined conditions are fulfilled. More specifically, the fourth control apparatus sets the target rich air-fuel ratio afRich when the predetermined conditions are fulfilled to a value less than the target rich air-fuel ratio afRich when the predetermined conditions are not fulfilled, and sets the target lean air-fuel ratio afLean when the predetermined conditions are fulfilled to a value greater than the target lean air-fuel ratio afLean when the predetermined conditions are not fulfilled.

(Actual Operation)

The CPU of the fourth control apparatus executes the routines shown in FIGS. 5 to 7 in the same manner as the CPU of the first control apparatus. Further, the CPU of the fourth control apparatus executes the target air-fuel ratio calculation routine shown in FIG. 14 for each elapsed predetermined time interval. Those of steps shown in FIG. 14 which are also shown in FIG. 8 are assigned with reference numerals same as those of the steps shown in FIG. 8. Detailed explanation of those steps is herein omitted as appropriate.

Figure 14:
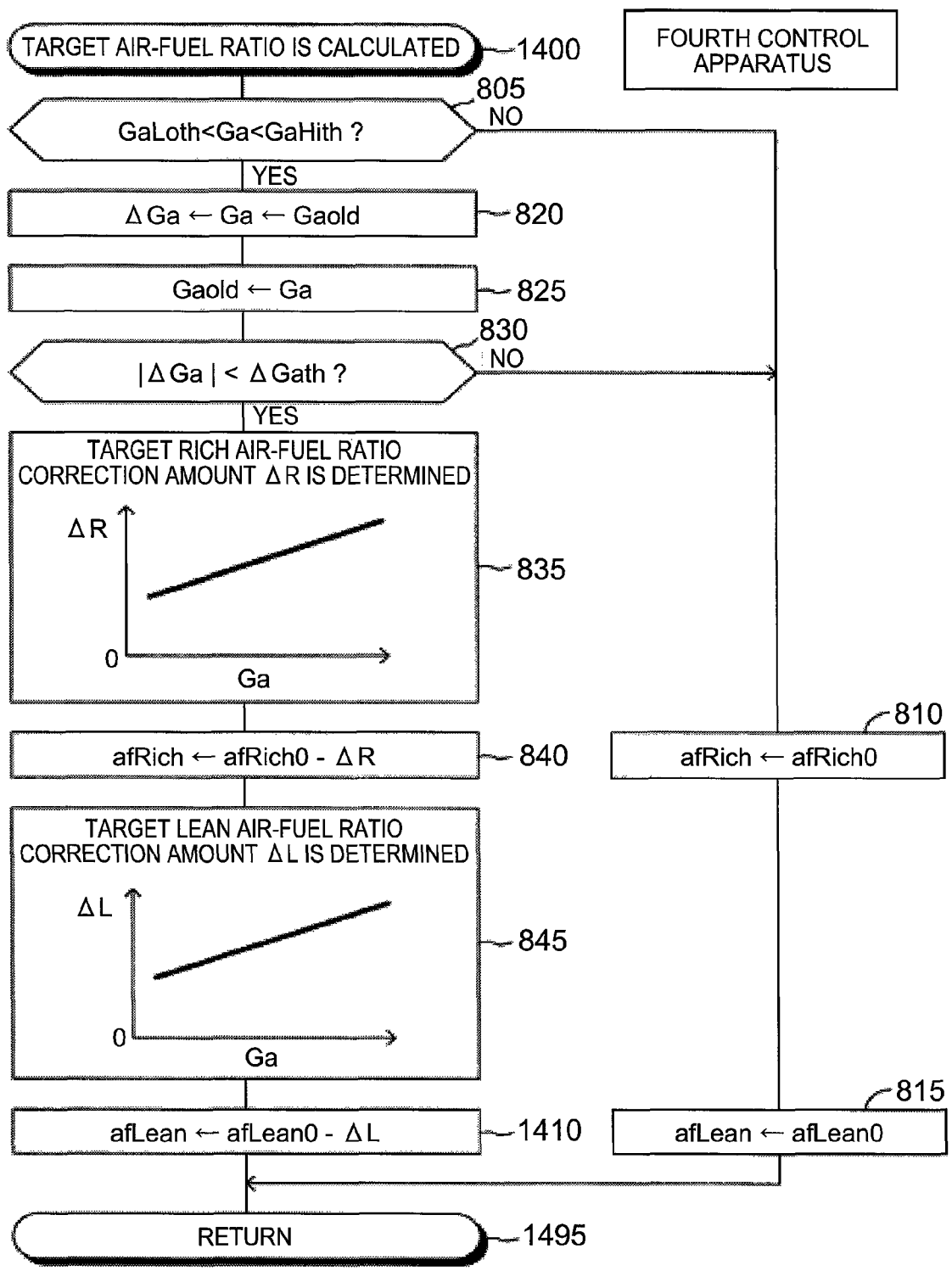
FIG. 14 is a flowchart illustrating the routine executed by the CPU of the control apparatus (fourth control apparatus) according to the fourth embodiment of the invention.

When the above-described predetermined conditions are not fulfilled, the CPU advances to step 810 shown in FIG. 14 and sets the target rich air-fuel ratio afRich to a constant reference target rich air-fuel ratio afRich0. Then, the CPU advances to step 815 and sets the target lean air-fuel ratio afLean to a constant reference target lean air-fuel ratio afLean0.

By contrast, when the above-described predetermined conditions are fulfilled, the CPU successively performs the processing of the below-described step 835 to step 845 and step 1410 and then advances to step 1495 and temporarily ends the present routine.

In step 835, the CPU determines the target rich air-fuel ratio correction amount $\Delta$R on the basis of the intake air amount Ga. The target rich air-fuel ratio correction amount $\Delta$R is determined to increase with the increase in the intake air amount Ga.

In step 840, the CPU sets the target rich air-fuel ratio afRich to a value (afRich0−$\Delta$R) obtained by subtracting the target rich air-fuel ratio correction amount $\Delta$R from the reference target rich air-fuel ratio afRich0. As a result, the target rich air-fuel ratio afRich is calculated as an air-fuel ratio that decreases to withdraw from the stoichiometric air-fuel ratio stoich as the intake air amount Ga increases.

In step 845, the CPU determines the target lean air-fuel ratio correction amount $\Delta$L on the basis of the intake air amount Ga. The target lean air-fuel ratio correction amount $\Delta$L is determined to increase with the increase in the intake air amount Ga. In this case, the target lean air-fuel ratio correction amount $\Delta$L corresponding to any intake air amount Ga is determined as a value equal to the rich air-fuel ratio correction amount $\Delta$R corresponding to this intake air amount Ga. However, the target lean air-fuel ratio correction amount $\Delta$L corresponding to any intake air amount Ga may be also determined as a value different from the rich air-fuel ratio correction amount ΔR corresponding to this intake air amount Ga.

In step 1410, the CPU sets the target lean air-fuel ratio afLean to a value (afLean0+ΔL) obtained by adding the target lean air-fuel ratio correction amount ΔL to the reference target lean air-fuel ratio afLean0. As a result, the target lean air-fuel ratio afLean is calculated as an air-fuel ratio that increases to withdraw from the stoichiometric air-fuel ratio stoich as the intake air amount Ga increases.

As described hereinabove, with the fourth control apparatus, when the predetermined conditions (condition 1 and condition 2) are fulfilled, in other words, when the a large amount of NOx is predicted to flow into the catalyst 43, the target lean air-fuel ratio afLean is increased by the target lean air-fuel ratio correction amount ΔL by comparison with the case in which the predetermined conditions are not fulfilled, and the target rich air-fuel ratio afRich is decreased by the target rich air-fuel ratio correction amount ΔR by comparison with the case in which the predetermined conditions are not fulfilled. As a result, the exhaust gas with an air-fuel ratio larger than usual (when the predetermined conditions are not fulfilled) and the exhaust gas with the air-fuel ratio less than usual alternately flow to the catalyst 43. However, since the target rich air-fuel ratio correction amount ΔR and the target lean air-fuel ratio correction amount ΔL are equal to each other, "the average value of the target rich air-fuel ratio afRich and the target lean air-fuel ratio afLean" in the case where the predetermined conditions (condition 1 and condition 2) are fulfilled becomes the stoichiometric air-fuel ratio stoich.

As a result, the fluctuation width of the air-fuel ratio of the gas flowing into the catalyst 43 increases and, therefore, the oxidation-reduction reaction inside the catalyst 43 is activated, whereby the amount of heat generated by the reaction increases. As a result, when the predetermined conditions are fulfilled, the temperature of the catalyst 43 can be raised. Therefore, even when the engine 10 is thereafter accelerated and a large amount of NOx flows into the catalyst 43, the reduction rate of NOx in the catalyst 43 increases and the catalyst 43 thus can decrease a large amount of NOx. As a result, the amount of the unreduced NOx flowing out of the catalyst 43 can be reduced.

As described hereinabove, the air-fuel control apparatuses of the embodiment of the invention are the air-fuel ratio control apparatuses for an internal combustion engine which are provided with an air-fuel ratio control means for controlling the air-fuel ratio of the engine on the basis of the output value Voxs of the downstream air-fuel ratio sensor 67.

Further, the air-fuel ratio control means includes condition determination means for determining whether or not the predetermined conditions for predicting that an operation state in which a large amount of nitrogen oxide flows into the catalyst is reached are fulfilled (see step 805 to step 830 in FIGS. 8, 11, and 13), and controls the air-fuel ratio of the engine 10 so that when the predetermined conditions are fulfilled, the concentration of the reducing agent in the catalyst 43 rises (first to third control apparatuses), over that when the predetermined conditions are not fulfilled.

Further, the first to third control apparatuses are configured to increase the concentration of the reducing agent in the catalyst 43 when the predetermined conditions are fulfilled by controlling the air-fuel ratio of the engine 10 so that the average value of the air-fuel ratio of the engine 10 obtained when the predetermined conditions are fulfilled becomes less than the average value of the air-fuel ratio of the engine 10 obtained when the predetermined conditions are not fulfilled.

Alternatively, the air-fuel ratio control means includes condition determination means for determining whether or not the predetermined conditions for predicting that an operation state in which a large amount of nitrogen oxide flows into the catalyst is reached are fulfilled (see step 805 to step 830 in FIG. 14), and controls the air-fuel ratio of the engine 10 so that when the predetermined conditions are fulfilled, the temperature of the catalyst 43 rises (fourth control apparatus), over that when the predetermined conditions are not fulfilled.

Thus, the air-fuel ratio control means includes means for determining whether or not an operation state in which a large amount of nitrogen oxide flows into the catalyst 43 is reached on the basis of "whether the predetermined conditions are fulfilled".

Therefore, when the engine 10 is accelerated and a large amount of NOx flows into the catalyst 43, the control apparatuses can set the reduction rate of NOx in the catalyst 43 to a large value there before, thereby making it possible to decrease a large amount of NOx with the catalyst 43. As a result, the amount of unreduced NOx flowing out of the catalyst 43 can be reduced.

The invention is not limited to the above-described embodiments and various examples can be used within the scope of the invention. For example, the first to fourth control apparatuses can be combined, as long as no contradiction arises. Further, the intake air amount Ga used in step 835, step 845, step 1130, step 1140, step 1330, and step 1340 may be above-described intake air amount correlation value.

The invention claimed is:

1. An air-fuel ratio control apparatus for an internal combustion engine, comprising:
   a catalyst provided in an exhaust passage of the internal combustion engine;
   a downstream air-fuel ratio sensor provided downstream of the catalyst in the exhaust passage; and
   an electronic control unit configured to control an air-fuel ratio of the engine, which is an air-fuel ratio of a gas mixture supplied to the engine, on a basis of an output value of the downstream air-fuel ratio sensor, wherein the electronic control unit is further configured to:
   determine whether or not a predetermined condition for predicting that the air-fuel ratio of the engine at a point in time in which an acceleration is performed is leaner than a stoichiometric air-fuel ratio, is fulfilled; and
   increase a concentration of a reducing agent in the catalyst when the predetermined condition is fulfilled over that when the predetermined condition is not fulfilled, by controlling the air-fuel ratio of the engine so that an average value of the air-fuel ratio of the engine obtained when the predetermined condition is fulfilled, becomes less than the average value of the air-fuel ratio of the engine obtained when the predetermined condition is not fulfilled,
   wherein the predetermined condition is a condition fulfilled when at least one of the following conditions is fulfilled: an intake air amount correlation value that increases as an intake air amount of the engine increases is greater than a low-side air amount threshold and less than a high-side air amount threshold that is greater than the low-side air amount threshold, or a speed of a vehicle carrying the engine is greater than a low-side speed threshold and less than a high-side speed threshold that is greater than the low-side speed threshold.

2. The air-fuel ratio control apparatus according to claim 1, wherein the predetermined condition is also a condition fulfilled when the electronic control unit further determines that a variation amount of the intake air amount correlation value per unit time is less than a predetermined variation amount threshold.

3. An air-fuel ratio control apparatus for an internal combustion engine, comprising:

a catalyst provided in an exhaust passage of the internal combustion engine:

a downstream air-fuel ratio sensor provided downstream of the catalyst in the exhaust passage; and an electronic control unit configured to control an air-fuel ratio of the engine, which is an air-fuel ratio of a gas mixture supplied to the engine, on a basis of an output value of the downstream air-fuel ratio sensor, wherein the electronic control unit is further configured to:

determine whether or not a predetermined condition for predicting that the air-fuel ratio of the engine at a point in time in which an acceleration is performed is leaner than a stoichiometric air-fuel ratio, is fulfilled;

increase a concentration of a reducing agent in the catalyst when the predetermined condition is fulfilled over that when the predetermined condition is not fulfilled, by controlling the air-fuel ratio of the engine so that an average value of the air-fuel ratio of the engine obtained when the predetermined condition is fulfilled, becomes less than the average value of the air-fuel ratio of the engine obtained when the predetermined condition is not fulfilled, set a target for the air-fuel ratio of the engine to a target rich air-fuel ratio that is less than a stoichiometric air-fuel ratio, when it is determined on the basis of the output value of the downstream air-fuel ratio sensor that an oxygen adsorption amount of the catalyst tends to be excessive and a rich request has been generated for causing a gas with a rich air-fuel ratio, which is less than the stoichiometric air-fuel ratio, to flow to the catalyst, and set a target for the air-fuel ratio of the engine to a target lean air-fuel ratio that is greater than the stoichiometric air-fuel ratio, when it is determined that the oxygen adsorption amount of the catalyst tends to be insufficient and a lean request has been generated for causing a gas with a lean air-fuel ratio, which is greater than the stoichiometric air-fuel ratio, to flow to the catalyst;

control a fuel amount supplied to the engine on the basis of the target air-fuel ratio that has been set:

set the target rich air-fuel ratio obtained when the predetermined condition is fulfilled to an air-fuel ratio that is less than the target rich air-fuel ratio obtained when the predetermined condition is not fulfilled: and determine that the rich request has been generated when a variation amount ΔVoxs of the output value of the downstream air-fuel ratio sensor per unit time has a negative value and an absolute value |ΔVoxs| thereof is greater than a lean determination threshold dLeanth, and to determine that the lean request has been generated when the variation amount ΔVoxs has a positive value and the absolute value |ΔVoxs| thereof is greater than a rich determination threshold dRichth.

4. An air-fuel ratio control apparatus for an internal combustion engine, comprising:

a catalyst provided in an exhaust passage of the internal combustion engine:

a downstream air-fuel ratio sensor provided downstream of the catalyst in the exhaust passage; and an electronic control unit configured to control an air-fuel ratio of the engine, which is an air-fuel ratio of a gas mixture supplied to the engine, on a basis of an output value of the downstream air-fuel ratio sensor, wherein the electronic control unit is further configured to:

determine whether or not a predetermined condition for predicting that the air-fuel ratio of the engine at a point in time in which an acceleration is performed is leaner than a stoichiometric air-fuel ratio, is fulfilled, increase a concentration of a reducing agent in the catalyst when the predetermined condition is fulfilled over that when the predetermined condition is not fulfilled, by controlling the air-fuel ratio of the engine so that an average value of the air-fuel ratio of the engine obtained when the predetermined condition is fulfilled, becomes less than the average value of the air-fuel ratio of the engine obtained when the predetermined condition is not fulfilled;

determine that a state of the catalyst is an oxygen excess state when a variation amount ΔVoxs of the output value of the downstream air-fuel ratio sensor per unit time has a negative value and an absolute value |ΔVoxs| thereof is greater than a lean determination threshold dLeanth, and determine that a state of the catalyst is an oxygen shortage state when the variation amount ΔVoxs has a positive value and the absolute value |ΔVoxs| thereof is greater than a rich determination threshold dRichth;

set a target for the air-fuel ratio of the engine to a target rich air-fuel ratio that is less than a stoichiometric air-fuel ratio, when a lean delay time, which is a predetermined delay time inclusive of 0, has elapsed since a point in time at which the catalyst state has been determined by the catalyst state determination unit to change from the oxygen shortage state to the oxygen excess state, and set a target for the air-fuel ratio of the engine to a target lean air-fuel ratio that is greater than the stoichiometric air-fuel ratio, when a rich delay time, which is a predetermined delay time inclusive of 0, has elapsed since a point in time at which the catalyst state has been determined by the catalyst state determination unit change from the oxygen excess state to the oxygen shortage state; and control a fuel amount supplied to the engine on the basis of the target air-fuel ratio that has been set, and set the rich delay time obtained when the predetermined condition is fulfilled to a time longer than the rich delay time obtained when the predetermined condition is not fulfilled.

5. An air-fuel ratio control apparatus for an internal combustion engine, comprising:

a catalyst provided in an exhaust passage of the internal combustion engine:

a downstream air-fuel ratio sensor provided downstream of the catalyst in the exhaust passage; and an electronic control unit configured to control an air-fuel ratio of the engine, which is an air-fuel ratio of a gas mixture supplied to the engine, on a basis of an output value of the downstream air-fuel ratio sensor, wherein the electronic control unit is further configured to:

determine whether or not a predetermined condition for predicting that the air-fuel ratio of the engine at a point in time in which an acceleration is performed is leaner than a stoichiometric air-fuel ratio, is fulfilled, and increase a concentration of a reducing agent in the catalyst when the predetermined condition is fulfilled over that when the predetermined condition is not fulfilled, by controlling the air-fuel ratio of the engine so that an average value of the air-fuel ratio of the engine obtained when the predetermined condition is fulfilled, becomes less than the average value of the air-fuel ratio of the engine obtained when the predetermined condition is not fulfilled;

determine that a state of the catalyst is an oxygen excess state when a variation amount $\Delta Voxs$ of the output value of the downstream air-fuel ratio sensor per unit time has a negative value and an absolute value $|\Delta Voxs|$ thereof is greater than a lean determination threshold dLeanth, and determine that the state of the catalyst is an oxygen shortage state when the variation amount $\Delta Voxs$ has a positive value and the absolute value $|\Delta Voxs|$ thereof is greater than a rich determination threshold dRichth;

set a target for the air-fuel ratio of the engine to a target rich air-fuel ratio that is less than a stoichiometric air-fuel ratio, when a lean delay time, which is a predetermined delay time, has elapsed since a point in time at which the catalyst state has been determined to change from the oxygen shortage state to the oxygen excess state, and set the target for the air-fuel ratio of the engine to a target lean air-fuel ratio that is greater than the stoichiometric air-fuel ratio, when a rich delay time, which is a predetermined delay time inclusive of 0, has elapsed since a point in time at which the catalyst state has been determined to change from the oxygen excess state to the oxygen shortage state; and control a fuel amount supplied to the engine on the basis of the target air-fuel ratio that has been set, and set the lean delay time obtained when the predetermined condition is fulfilled to a time shorter than the lean delay time obtained when the predetermined condition is not fulfilled.

6. An air-fuel ratio control apparatus for an internal combustion engine, comprising:

a catalyst provided in an exhaust passage of the internal combustion engine:

a downstream air-fuel ratio sensor provided downstream of the catalyst in the exhaust passage; and an electronic control unit configured to control an air-fuel ratio of the engine, which is an air-fuel ratio of a gas mixture supplied to the engine, on a basis of an output value of the downstream air-fuel ratio sensor, wherein the electronic control unit is further configured to:

determine whether or not a predetermined condition for predicting that the air-fuel ratio of the engine at a point in time in which an acceleration is performed is leaner than a stoichiometric air-fuel ratio, is fulfilled, and increase a concentration of a reducing agent in the catalyst when the predetermined condition is fulfilled over that when the predetermined condition is not fulfilled, by controlling the air-fuel ratio of the engine so that an average value of the air-fuel ratio of the engine obtained when the predetermined condition is fulfilled, becomes less than the average value of the air-fuel ratio of the engine obtained when the predetermined condition is not fulfilled;

set a target for the air-fuel ratio of the engine to a target rich air-fuel ratio that is less than a stoichiometric air-fuel ratio, when a variation amount $\Delta Voxs$ of the output value of the downstream air-fuel ratio sensor per unit time has a negative value and an absolute value $|\Delta Voxs|$ thereof is greater than a lean determination threshold dLeanth, and set the target for the air-fuel ratio of the engine to a target lean air-fuel ratio that is greater than the stoichiometric air-fuel ratio, when the variation amount $\Delta Voxs$ has a positive value and the absolute value $|\Delta Voxs|$ thereof is greater than a rich determination threshold dRichth; and control a fuel amount supplied to the engine on the basis of the target air-fuel ratio that has been set, and set the rich determination threshold dRichth obtained when the predetermined condition is fulfilled to a value greater than that of the rich determination threshold dRichth obtained when the predetermined condition is not fulfilled.

7. An air-fuel ratio control apparatus for an internal combustion engine, comprising:

a catalyst provided in an exhaust passage of the internal combustion engine:

a downstream air-fuel ratio sensor provided downstream of the catalyst in the exhaust passage; and an electronic control unit configured to control an air-fuel ratio of the engine, which is an air-fuel ratio of a gas mixture supplied to the engine, on a basis of an output value of the downstream air-fuel ratio sensor, wherein the electronic control unit is further configured to:

determine whether or not a predetermined condition for predicting that the air-fuel ratio of the engine at a point in time in which an acceleration is performed is leaner than a stoichiometric air-fuel ratio, is fulfilled, and increase a concentration of a reducing agent in the catalyst when the predetermined condition is fulfilled over that when the predetermined condition is not fulfilled, by controlling the air-fuel ratio of the engine so that an average value of the air-fuel ratio of the engine obtained when the predetermined condition is fulfilled, becomes less than the average value of the air-fuel ratio of the engine obtained when the predetermined condition is not fulfilled;

set a target for the air-fuel ratio of the engine to a target rich air-fuel ratio that is less than a stoichiometric air-fuel ratio, when a variation amount $\Delta Voxs$ of the output value of the downstream air-fuel ratio sensor per unit time has a negative value and an absolute value $|\Delta Voxs|$ thereof is greater than a lean determination threshold dLeanth, and set the target for the air-fuel ratio of the engine to a target lean air-fuel ratio that is greater than the stoichiometric air-fuel ratio, when the variation amount $\Delta Voxs$ has a positive value and the absolute value $|\Delta Voxs|$ thereof is greater than a rich determination threshold dRichth; and control a fuel amount supplied to the engine on the basis of the target air-fuel ratio that has been set, and set the lean determination threshold dLeanth obtained when the predetermined condition is fulfilled to a value less than that of the lean determination threshold dLeanth obtained when the predetermined condition is not fulfilled.

* * * * *